United States Patent [19]
Clark et al.

[11] 3,943,298
[45] Mar. 9, 1976

[54] AUTOMATIC NUMBER IDENTIFICATION

[75] Inventors: Robert J. Clark, Fairport; Gordon H. Davis, Canandaigua; Amin Y. Zaky, Rochester, all of N.Y.

[73] Assignee: Stromberg-Carlson Corporation, Rochester, N.Y.

[22] Filed: June 26, 1974

[21] Appl. No.: 483,477

[52] U.S. Cl. .......................... 179/18 FH
[51] Int. Cl.² .......................... H04Q 3/72
[58] Field of Search .......... 179/18 FH, 17 A

[56] References Cited
UNITED STATES PATENTS

| | | | |
|---|---|---|---|
| 3,413,421 | 11/1968 | Cochran et al. ............ | 179/18 FH |
| 3,749,844 | 7/1973 | Dufton ...................... | 179/18 ES |
| 3,787,632 | 1/1974 | Male et al. ................. | 179/18 FH |

*Primary Examiner*—Thomas W. Brown
*Attorney, Agent, or Firm*—William F. Porter, Jr.; William A. Marvin; Edward A. Gerlaugh

[57] ABSTRACT

An automatic number identification system in a tributary office having simultaneous dual operation for high traffic capacity. A pair of identifier units applying identification signals via the sleeve wire associated with the calling stations to a common matrix or directory number network.

11 Claims, 15 Drawing Figures

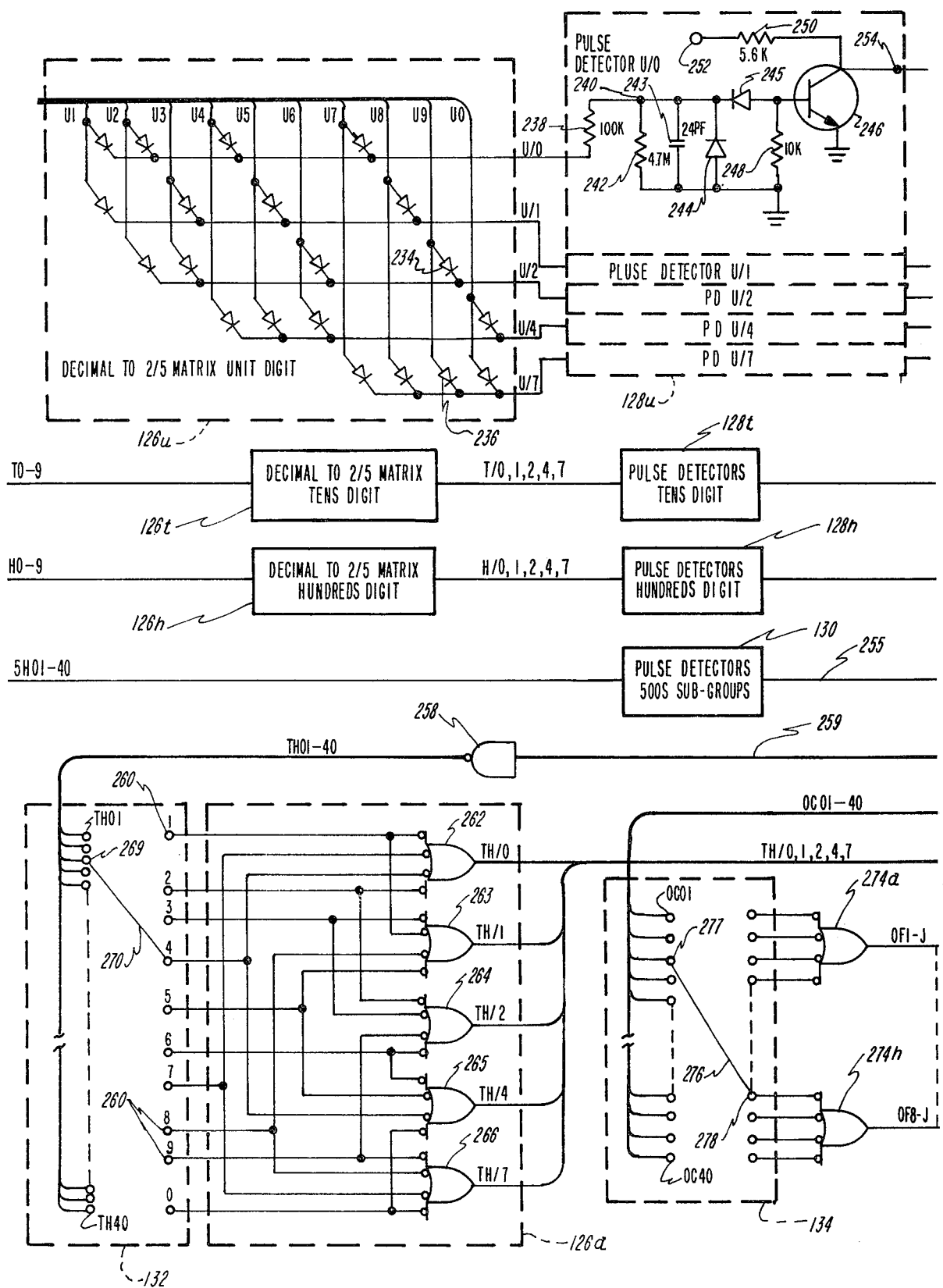

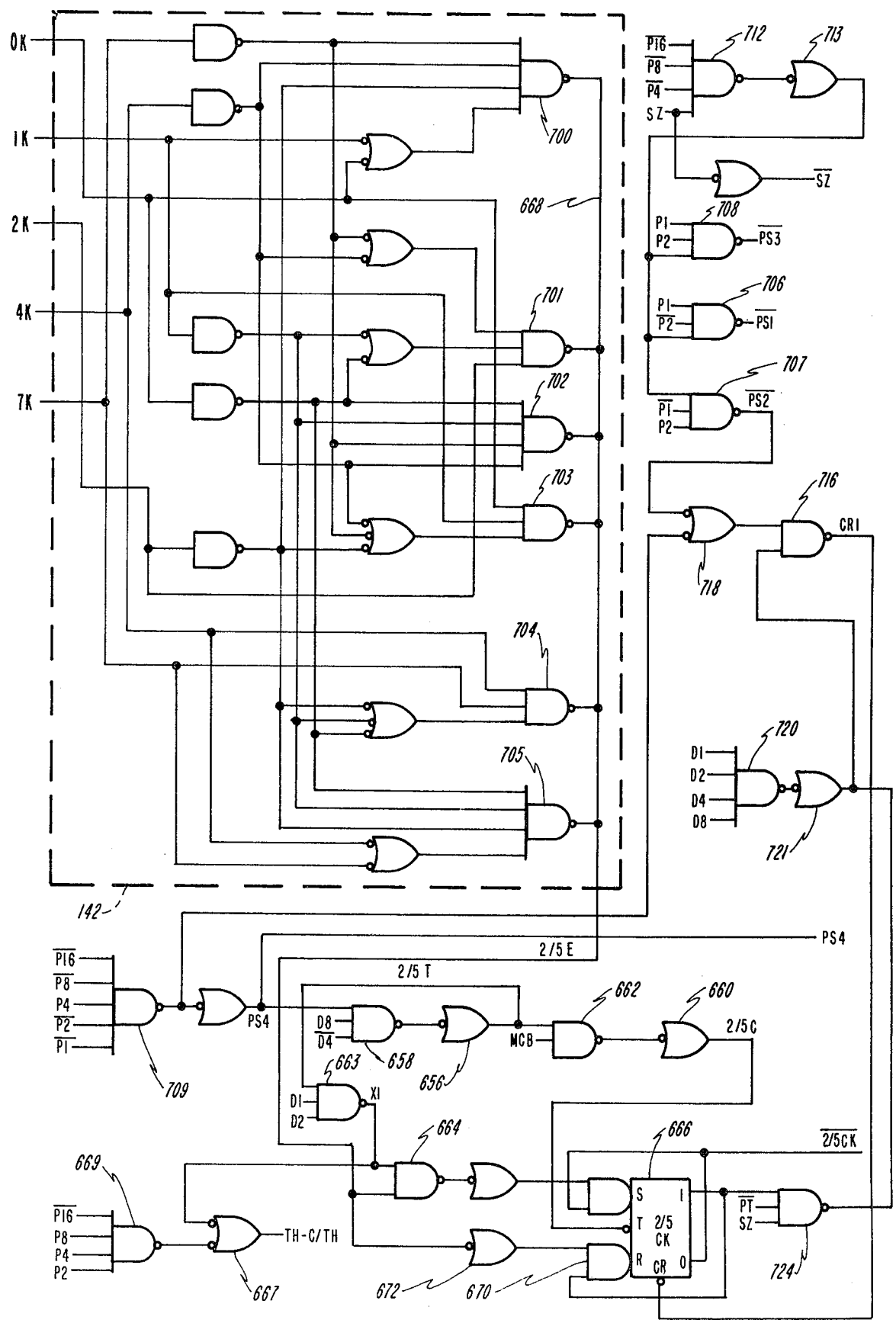
Fig_4e

AUTOMATIC NUMBER IDENTIFICATION

This invention relates to telephone systems, and more particularly, to an improved means for use in an automatic telephone system for identifying the directory number of a station on a line originating a call.

In automatic telephone systems having direct distance dialing (DDD) capability, toll determining equipment is commonly located in a central office serving a plurality of tributary or end offices. In order to assess the tolls for long distance calls against the correct calling stations, there is a need for automatic number identification (ANI) apparatus in the tributary offices. Upon request from the central office with toll determining equipment (hereinafter termed central automatic message accounting or CAMA office), the end office ANI equipment determines the directory number of the calling station and transmits the number to the CAMA office.

Generally, identification of a calling station is accomplished through the use of one or more matrices or networks of passive components comprising at least as many individual matrix elements as there are lines to be identified in the office. An input terminal for each of the elements is connected or strapped to a control wire, usually the equipment number sleeve wire, associated with one of the subscriber lines of the end office. The strap for each line may be connected to an appropriate input terminal as determined by the values of the last four digits forming the directory number of the calling station. The outputs of each matrix may then, e.g., be multipled to four groups of output buses, one group each associated with the thousands, hundreds, tens and units digits of the calling number. Other special output lines may be provided for detecting class-of-call information of designated ones of the calling stations. The output lines and buses are selectively connected through the matrix elements to the input terminals thereof in such a manner that an identification signal applied to one of the input terminals will cause a distinctive signal to appear on one or more of the lines, e.g., on one of the lines of each of the groups of buses. In response to the distinctive signals detected, the identifier equipment initiates such action as may be appropriate for the station thus identified, e.g., transmitting the calling number in the proper sequence along with appropriate office-code information digits to the CAMA toll center.

In high capacity tributary offices operating with a distant CAMA office, the ANI apparatus has in the past impeded traffic flow during peak operating periods. In such systems, the requests for the identification of a calling subscriber originate in the toll center and are transmitted to the tributary office where they are processed serially by the ANI equipment. During such high traffic periods, subscribers experiencing seemingly interminable delays in the processing of a DDD call may terminate the call prematurely. Alternatively, if the local outgoing trunk circuit is unable to seize an identifier circuit in a timely manner after receiving an identification request from the CAMA office, the CAMA office may return a circuits-busy signal to the local trunk and terminate the call.

SUMMARY OF THE INVENTION

It is therefore a broad object of the present invention to provide a new and improved means for automatically identifying the number of a station on a line originating a call.

It is a more particular object of this invention to provide a new and improved means for automatically and rapidly identifying the directory number of a plurality of calling stations while greatly reducing the probability of noticeable delay or blockage.

It is another object of the present invention to provide means for automatically identifying the directory number of more than one line originating calls in an apparently simultaneous manner utilizing dual identifiers with one number network or matrix common to both identifiers.

These and other objects and features of the invention are achieved in accordance with one aspect of the invention by a pair of identifiers operating in a tributary office through a common directory number network to simultaneously identify two calling stations. Each of the identifiers, having been seized by a trunk circuit requiring calling number identification, initiate a program which applies an identification pulse through the local switching equipment to the sleeve lead of the calling line. The pulse is of relatively short duration compared with the program time. The first of the two identifiers to generate its pulse inhibits pulse generation in the other identifier during the period of the program when the first pulse is traversing the common number network and the first identifier is detecting and storing the directory number significance of the pulse. When the line associated with the first pulse has been so identified, the second identifier is released to generate another pulse for application to the sleeve lead of the calling line associated therewith. Both identifiers then proceed simultaneously to complete their respective identification programs and transmit the calling numbers to the toll center via the connected trunk circuits.

BRIEF DESCRIPTION OF THE DRAWINGS

The invention is set forth with particularity in the appended claims, however, other objects and features, the organization and method of operation of the invention will become more apparent, and the invention will be best understood by referring to the following detailed description in conjunction with the accompanying drawings in which:

FIGS. 4a–4f when arranged as shown in FIG. 4 form a detailed circuit diagram of the identifier of the present invention.

DESCRIPTION OF THE PREFERRED EMBODIMENT

Figure 1:
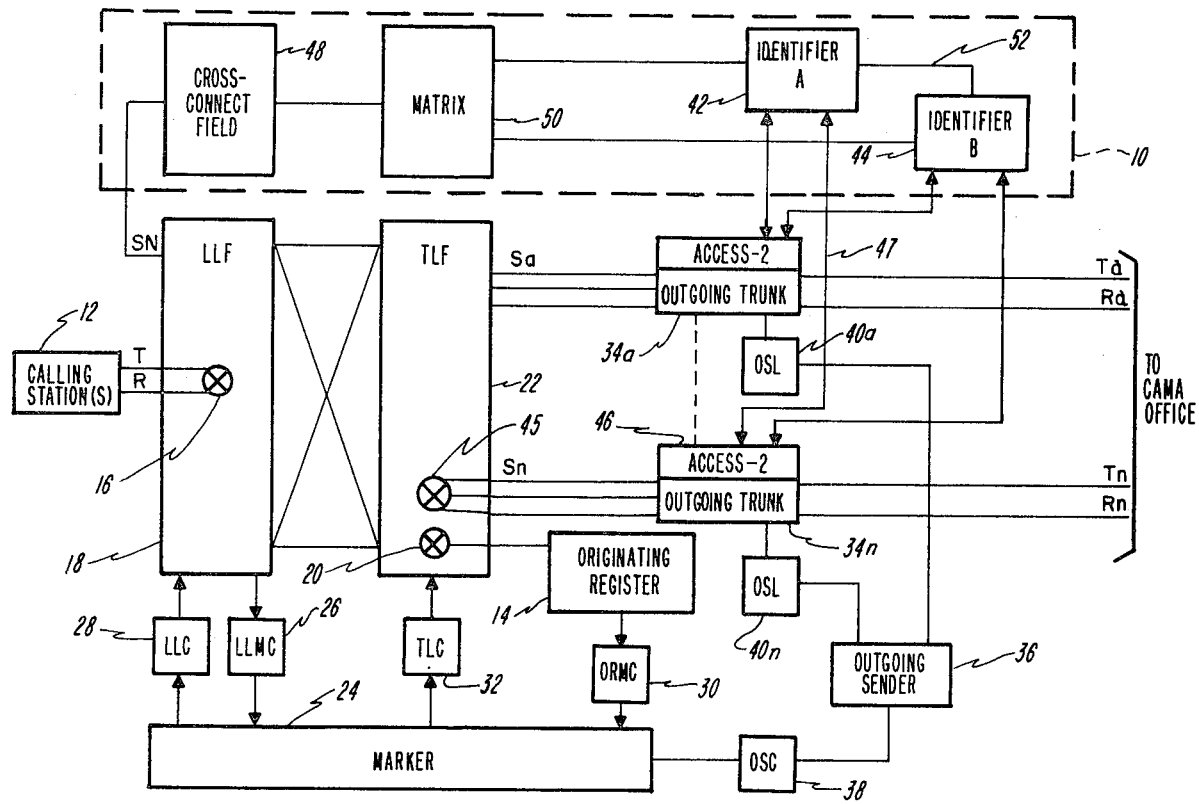
FIG. 1 is a block diagram of the dual automatic number identification system of the present invention as used in a tributary office of a telephone switching system.

Referring now to the various views of the drawing for a more detailed description of the operation, construction and other features of the invention by characters of reference, FIG. 1 illustrates generally a dual automatic number identification (ANI) system 10 connected in a telephone switching system wherein common control circuits are employed to control the establishment of calls through a switching network. It is assumed that the switching system of FIG. 1 is a tributary or end office operating with a CAMA toll center (not shown). One such switching system, the No. 5 crossbar system, is disclosed in U.S. Pat. No. 2,585,904. It is to be understood, however, that the switching system shown is exemplary and the present invention is not limited to use therewith, but may be utilized with other types of switching systems.

For purpose of general description, it is assumed that a telephone subscriber at a calling station 12 desires to place a long distance call. Upon an off-hook condition at the calling station 12, an idle originating register, such as originating register 14, is connected to station 12 via a linkage connection which extends from a line appearance 16 on line link frame 18 to appearance 20 on a trunk link frame 22. The linkage path constitutes a dial tone connection which is established under control of a dial tone marker circuit (which may be a part of a marker 24 of FIG. 1) based in part upon information received from a line link marker connector (LLMC) 26 and line link frame connector (LLC) 28. The LLMC 26 and LLC 28 provide the appearance 16 location and also the class-of-service of the calling station 12. The marker 24 then causes the registration of the class-of-service and the calling line appearance 16 location of station 12 in the originating register 14 via a trunk link connector (TLC) 32. The marker 24 thereupon releases from the connection. Dial tone is returned to calling station 12 from the originating register 14 in the well known manner, upon completion of the aforementioned linkage.

It is now assumed that the subscriber at calling station 12 dials or key pulses a long distance access code and the digits corresponding to the directory number of the called station. These digits are stored in the originating register 14 and upon completion of dialing, a completing marker circuit which may be a part of the marker 24, is seized in order to process the call further. The marker 24, via the trunk link connector 32, seizes an outgoing trunk such as outgoing trunk 34n. An available outgoing sender such as sender 36 is seized by the marker 24 via an outgoing sender connector (OSC) 38 and connected to the seized trunk 34n via outgoing sender link 40n. The directory digits of the called station as previously transferred from the originating register 14 to the marker 24, are then transmitted to the sender 36. The sender 36, in the well known manner, proceeds to transmit the directory number of the called station over the established connection from the outgoing trunk 34n to the CAMA office over tip and ring conductors Tn and Rn. When this action is complete, the CAMA office returns an answer supervision signal to the outgoing trunk 34n, e.g., as by loop battery reversal of the tip and ring conductors. Upon receiving the answer supervision signal, the outgoing trunk 34n extends a request service RS signal to each of two identifier units 42, 44 in the dual ANI system 10 via an access-2 circuit associated with the requesting trunk. If both identifier units 42, 44 are busy servicing other outgoing trunks, outgoing trunk 34n must wait until one of the identifiers is released. If either of the identifier units 42, 44 is idle, a ground is returned from the idle identifier, (such as identifier A 42) to the access-2 circuit 46 associated with the requesting outgoing trunk 34n, whereupon the outgoing trunk 34n seizes identifier A 42. When the outgoing trunk 34n seizes the identifier A 42, the subscriber's sleeve lead Sn is extended into the identifier unit A 42. An identification pulse is applied from the identifier A 42 to the subscribers sleeve lead Sn via bus 47, through the outgoing trunk 34n, to its appearance 45 in the TLF 22, through the LLF 18, and back to the identifier A 42 via a cross-connect field 48 and a matrix 50. A particular input connection of the matrix 50 corresponds with the sleeve lead SN of the calling station 12; identifier A 42 detects the particular connection through which the identifying pulse returns through the matrix 50 and stores indicia representative of the directory number of the calling station 12. Subsequently, identifier A 42 outpulses the calling station's number via tip and ring leads Tn, Rn to the CAMA office. Since it is possible for each of the identifiers 42, 44 to be simultaneously servicing one of the outgoing trunks 34a–n, and the crossconnect field 48 and matrix 50 are common to both identifiers 42, 44, the identifier unit issuing the identification pulse also generates a lockout signal which is transferred via line 52 to the other identifier unit, thereby preventing interference in the common matrix 50 between two identification pulses serving two different outgoing trunks.

The seizure of an identifier 42, 44 by the access-2 circuit 46 is explained with reference to FIG. 2. Upon receiving answer supervision from the CAMA office, the outgoing trunk 34n transmits a request service RS signal via the access-2 circuit 46 and a signal converter 54 to the "set" input of a seize bistable 56 of the identifier 42. The seize bistable 56, enables by the RS signal, generates an SZ signal from its set output which is transferred via a NOT element 58 to the coil of a seize relay 60. An electronic battery circuit 62, termed herein a bait battery, supplies a −48 vdc potential 64 via a switch circuit 63 and line BB(A) to an access-A circuit 66 of the access-2 46. The seize relay 60, actuated by the enabled seize bistable 56, extends ground via its normally-open contacts 68 to a junction 70 of the access-A circuit. The ground at the junction 70 is returned via normally closed contacts 71 of an SA relay 72 and a junction 82 to the trunk circuit 34n as acknowledgement that the access-2 circuit 46 has received the RS signal. Simultaneously, the ground at the junction 82 is applied to a switching circuit 74. In response to the ground signal at the junction 82, the switching circuit 74 applies the −48 vdc potential on line BB(A) to the coil of the SA relay 72. As the SA relay energizes, sufficient current flows through line BB(A) and a resistor 78 to cause zener diode 80 to conduct. Zener diode 80, having a breakdown voltage of approximately −24 vdc, causes the voltage on line BB(A) to be lowered and subsequently maintained at −24 vdc. The potential with respect to ground present on the BB(A) lead is thus decreased from a −48 vdc "idle" level to a −24 vdc "busy" level. The busy level on line BB(A) prevents other access-2 circuits from seizing the identifier 42. Concurrently with the lowering of the potential on line BB(A), the SA relay 72 is energized and held by an internally supplied −48 vdc potential 76. Energizing the SA relay extends the leads associated with the calling station 12 (FIG. 1), such as leads S, T and R, from the trunk circuit 34n via normally open contacts SA into the identifier 42. The ground signal at terminal 40 is applied via normally open contacts 84 of the energized SA relay 72 and a marking resistor 86 to a threshold detector 88 in the bait battery 62. If the threshold detector 88 detects more than one marking resistance to ground, as for example, in the event that two access-2 circuits simultaneously seize an identifier bait battery, a fault signal is generated by the threshold detector 88 and transferred via an amplifier 90 and an inverter 92 to the switch circuit 63. In response to the fault signal applied from the inverter 92, the switch circuit 63 applies a ground to the BB(A) lead, de-energizing the SA relay, thus disabling the connection between the identifier unit 42 and the access-2 circuit 46.

The access-2 circuit 46 includes two identically operating access circuits, vis.: the access-A circuit 66 described in the preceding paragraph and an access-B circuit which serves to connect a requesting trunk circuit 34 to identifier B 44. The foregoing description of the seizure of an identifier circuit by an access-2 circuit utilized block diagrams to illustrate the interaction between the various system components. For a more detailed description of the structure, arrangement, components and operation of the bait battery circuit 62 and the access circuit 66 of FIG. 2, reference is made to a co-pending application Ser. No. 357,320, filed on May 4, 1973, for D. R. Merriam, and assigned to the same assignee as the present invention, now an issued U.S. Pat. No. 3,824,348.

Figure 2:
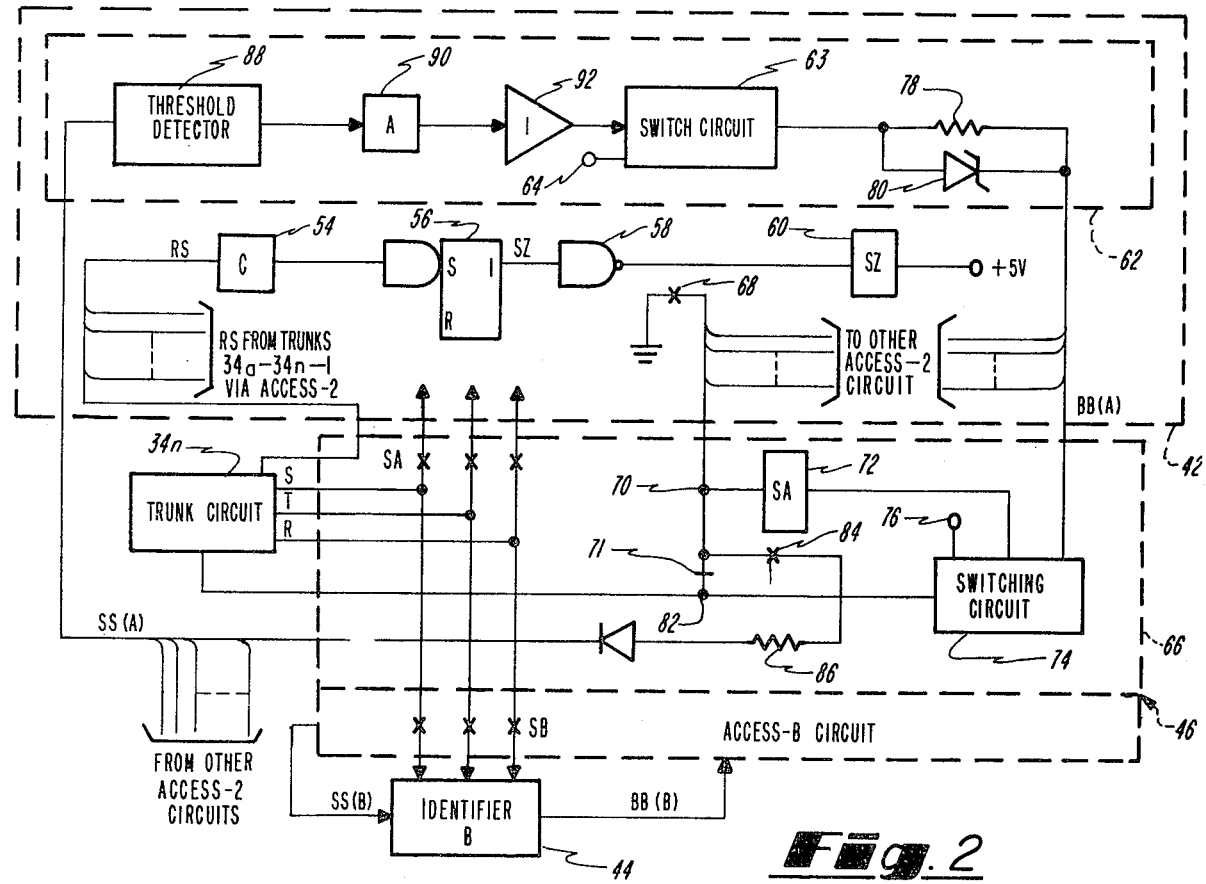
FIG. 2 is a detailed block diagram of the interface between the access circuits of the requesting trunk and the identifier of the present invention.
Figure 3:
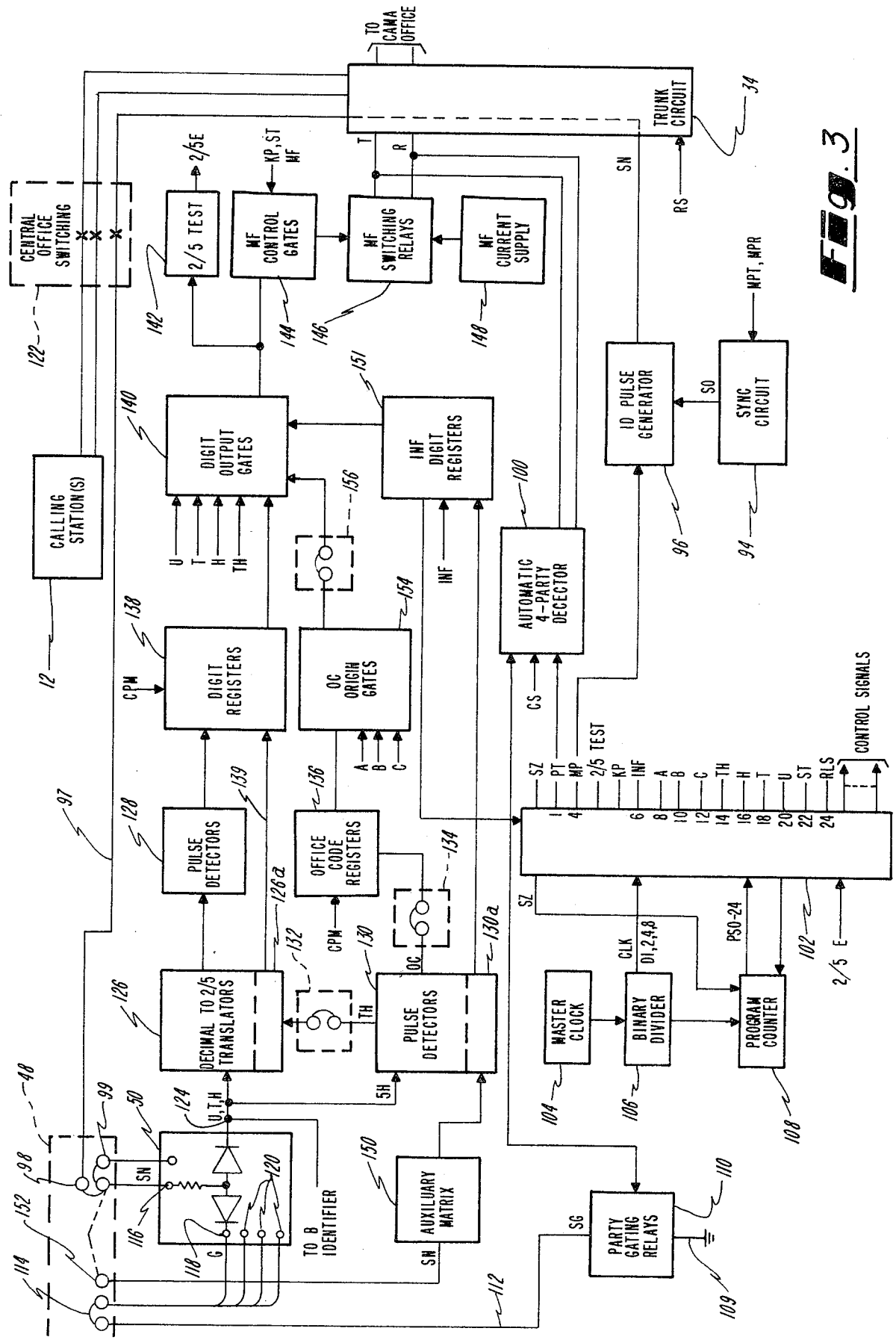
FIG. 3 is a detailed block diagram of a single unit of the automatic number identifier of the present invention.

Referring now to FIG. 3, there is shown a detailed block diagram of an identifier (such as identifier A 42, FIGS. 1 and 2), including the crossconnect field 48 and the matrix 50. Upon seizure of the identifier by the trunk circuit 34 as previously described with reference to FIG. 2, tip and ring conductors T, R associated with the calling station 12 are extended from the trunk circuit 34 into the identifier where they are connected to an MF switching relay unit 146 and an automatic 4-party detector circuit 100. Similarly, the sleeve lead SN associated with the calling station 12 is extended through the trunk circuit 34 into the identifier unit and connected to an identification (ID) pulse generator 96. The station side 97 of the sleeve lead is connected to a terminal 98 of the crossconnect field 48. The terminal 98 is strapped to one of a plurality of terminals 116 of the diode-resistor matrix 50. The terminal 116 leads to an element of the matrix which corresponds with the number of the calling station 12. For simplicity, only one element of the matrix 50 is shown in FIG. 3.

If the calling station 12 is a multi-party line, the station side 97 of the sleeve lead SN extended into the identifier is connected in the crossconnect field 48 via terminal 98 and strapping 99 to other elements (not shown) of the matrix 50. The number of elements of the matrix 50, connected to one sleeve lead corresponds with the number of parties on the line, and each of the elements so connected corresponds with the last four digits of the directory number assigned a different one of the parties.

As previously described with references to FIG. 2, seizure of the identifier unit by the trunk circuit 34 enables the seize bistable SZ located in a timing and control unit 102 of the identifier. The identifier is equipped with a continuously running master clock 104 which in the presently described embodiment provides a 235 Hz signal to a binary divider 106. The binary divider 106 provides timing pulses to the timing and control unit 102 and to a program counter 108. The program counter periodically generates a signal set representative of an alterable ordered series of steps or operations called a program. When the identifier is seized, the SZ signal from the enabled seize bistable is transferred from the timing and control unit 102 to the program counter 108 to start the program which proceeds in the series of program steps PS 0-24 to identify the number of the calling station 12 and outpulse the number via the trunk circuit 34 to the CAMA office.

Certain of the program steps PS 0-24 are listed in the block 102 of FIG. 3; control signals associated with the program steps are shown adjacent the listed program steps. In order to achieve a meaningful and orderly progression of operations or program steps involved in the identification and transmission to the CAMA office of the number of the calling station 12 and the attendant movement of information signals and data among the various units, registers and other elements of the ANI system, after a need for specific movements, combinations of movements or operations has been established, control signals and timing pulses must be generated or issued to permit the prescribed movement or operation at the desired time. Any undesirable movements or operations must likewise be inhibited. The exact manner in which specific control signals are logically derived and timing pulses are generated from a clock source (such as the master clock 104), delay network or divider according to precisely defined conditions within the system at certain precisely defined times has become a matter of common knowledge within the art. Therefore, in the ensuing discussion, no attempt is made to describe in great detail the circuit origins of each of the control signals and timing pulses which bring about the information movements or initiate operations within the system. For example, in the embodiment described herein, the timing and control unit 102 receives timing pulses from the binary divider 106 and the program counter 108. The divider 106 and counter 108 may be binary counter circuits as described in Chapter 3 of Electronic Digital Components and Circuits by R. K. Richards, published in 1967 by D. Van Nostrand Company, Inc.

During program steps 1–3, a PT party test signal from the timing and control unit 102 actuates the automatic four-party detector 100. The four-party detector 100 tests the tip and ring conductors extended thereto from the trunk circuit 34 to determine which of the parties associated with calling station 12 is off-hook. Signals from the detector 100 actuate party-gating relays 110 to apply a ground 109 to the appropriate SG leads 112. The SG leads 112 are strapped via connections 114 (only one of which is shown in FIG. 3) of the crossconnect field 48 to the G terminals of matrix 50. Assuming the SN terminal 116 represents the sleeve lead connection to the matrix 50 of one of four parties of calling station 12 which is off-hook, and G terminal 118 is the corresponding G lead input for SN terminal 116, the other three parties having G terminal connections 120 to the matrix 50, then the ground 109 would be applied from the party-gating relays 110 to each of the three G terminals 120 via SG leads 112. G terminal 118 would be left "open" thereby allowing the corresponding SN terminal 116 to accept an identification pulse.

In the presently described embodiment, the dual ANI system operates with a No. 5 crossbar tributary office to identify the number of the calling station 12 by generating an identification pulse in the ID pulse generator 96 and applying the pulse to the sleeve lead SN associated with the calling station 12. A sync circuit 94 receives message metering pulses MPT and MPR from the No. 5 crossbar office which pulses are also applied to the sleeve lead SN. The generator 96 receives an SO timing signal from the sync circuit 94 and in response thereto generates the ID pulse in timed relationship to the metering pulses MPT and MPR. The detailed operation of the sync circuit 94 is described in another portion of the present specification.

After the party test, in program step 4, an MP signal from the timing and control unit 102 initiates in the ID pulse generator 96 the generation of a pulse having a duration, in the presently described embodiment, of approximately 200 microseconds. The ID pulse is applied over the sleeve lead SN through trunk circuit 34, the central switching office 122 and the crossconnect field 48 to the SN terminal 116 assigned to the calling station 12. The ID pulse is channeled through the resistor diode matrices, only one of which is represented in the matrix 50 of FIG. 3, to a plurality of buses 124 having digital significance with respect to the number of the calling station 12 assigned to the SN terminal 116. The pulses on the lines of bus 124 having digital significance with respect to the units, tens and hundreds digits (labeled, respectively, U, T and H) of the calling station 12 number are converted in translators 126 from decimal to a two-out-of-five (2/5) code and applied to pulse detectors 128. The pulse detectors 128, one detector circuit for each line from the transistors 126, detect the presence of an ID pulse on the lines and generate logic signals for storage in digit registers 138. The bus 124 lines (labeled 5H) having digital significance with respect to the thousands digit of the calling station 12 number are connected to pulse detectors 130. Output lines TH of the pulse detectors 130 are connected through a thousands-digit strapping field 132 to the decimal-to-2/5 translators 126a. The TH output signals of the translators 126a are transferred via lines 139 to the digit registers 138 for storage therein. Output signals OC from the pulse detectors 130 are concurrently transferred via an office code strapping field 134 to office code registers 136 for storage therein. During the time when the ID pulse traverses the matrix 50 and the pulse detectors 128, 130, a CPM timing pulse is generated in the timing and control unit 102. The CPM pulse is transferred to the digit registers 138 to enable the storage therein of the logic signals from the pulse detectors 128 and the translators 126 which are representative, respectively, of the units, tens and hundreds digits, and of the thousands digits of the calling station 12 number. The CPM pulse is also transferred to the office code registers 136 to enable storage therein of the logic signal from the pulse detectors 130 which is representative of a predetermined office code. The stored contents of the digit registers 138 are then momentarily and sequentially gated via digit output gates 140 to a 2/5 test logic unit 142. If each of the digit registers, successively for the thousands, hundreds, units and tens digits, contain a valid representation of a digit in the correct two-out-of-five format, the program proceeds under control of the timing and control unit 102. Failure of the 2/5 test results in the generation of a 2/5 E signal which is transferred from the 2/5 test unit 142 to the timing and control unit 102. In response to the 2/5E signal, the timing and control unit recycles the program counter to program step 3 to initiate a second identification sequence. If two such recycles fail to produce a valid number in correct 2/5 format, the automatic detection sequence is aborted.

An auxiliary matrix 150, pulse detectors 130a and information (INF) digit registers 151 are provided to detect and store special service markings such as Operator Number Identification (ONI), Coin, Denied Service and PBX Cancel. The SN terminals of the lines requiring any of the aforementioned special service markings are connected to the auxiliary matrix 150 via the crossconnect field 48, as for example, via terminal 152. The auxiliary matrix 150 passes the ID pulse from the generator 96 to the appropriate one of the pulse detectors 130a. The detected pulse from the detectors 130a is transferred to information digit registers 151 and stored therein for subsequent use, e.g., by the timing and control unit 102 for controlling the program sequence in accordance with the special service marking.

Assuming now that the program continues under control of the control and timing unit 102, after the validity of the numbers held in the digit registers 138 has been determined, the identifier proceeds to outpulse the calling number in accordance with the needs of the particular installation. In tributary offices, the identifier out-pulses the key pulse (KP) signal, the INF digit, the 3-digit office code, the four digit calling number and the required ST signal in split 2-out-of-6 multifrequency code. A signal of one frequency is applied to the tip T of the line, and another to the ring R for each digit transmitted in accordance with Table 1.

TABLE 1

| | MULTIFREQUENCY SIGNALS | |
|---|---|---|
| DIGIT | TIP OF LINE FREQUENCY (HZ) | RING OF LINE FREQUENCY (HZ) |
| KP | 1100 | 1700 |
| 1 | 700 | 900 |
| 2 | 700 | 1100 |
| 3 | 1100 | 900 |
| 4 | 700 | 1300 |
| 5 | 900 | 1300 |
| 6 | 1100 | 1300 |
| 7 | 1500 | 700 |
| 8 | 1500 | 900 |
| 9 | 1500 | 1100 |
| 0 | 1500 | 1300 |
| ST | 1500 | 1700 |
| ST' | 900 | 1700 |
| ST'' | 1300 | 1700 |
| ST''' | 700 | 1700 |

A multifrequency (MF) current supply 148 runs continuously, supplying the six frequencies to contacts of MF switching relays 146 in the well known manner. Two relays of the MF switching relays 146 are operated by output signals from MF control gates 144 for each digit transmitted. The 3-digits of the office code are derived from the contents of the office code registers 136 having outputs enabled successively through office code origin gates 154 by control signals A, B and C generated during program steps 8, 10 and 12 by the timing and control unit 102. The outputs of the office code origin gates 154 are transferred via an office-code digit strapping field 156, in the proper 2/5 format, through the digit output gates 140 to the MF control gates 144.

Before proceeding with the detailed description, it is believed desirable to define several terms and explain conventions utilized therein. In the present system, as in any system, the various electrical signals and pulses generated and utilized will be of some particular magnitude. The values of these signals, where not germane to the present invention, will be described merely as "high level" or "low level", or alternately when referring to the output or intput signals of logic elements, "enabled" and "disabled". The names and conditions of logic elements described herein are set forth generally as defined in the IFIP-ICC Vocabulary of Information Processing, published in 1966 by North-Holland Publishing Company, Amsterdam. Information regarding the detailed operation and construction of such elements may be found in the publications relative to the art, e.g., in the aforementioned book by R. K. Richards.

Figures 4, 4A:
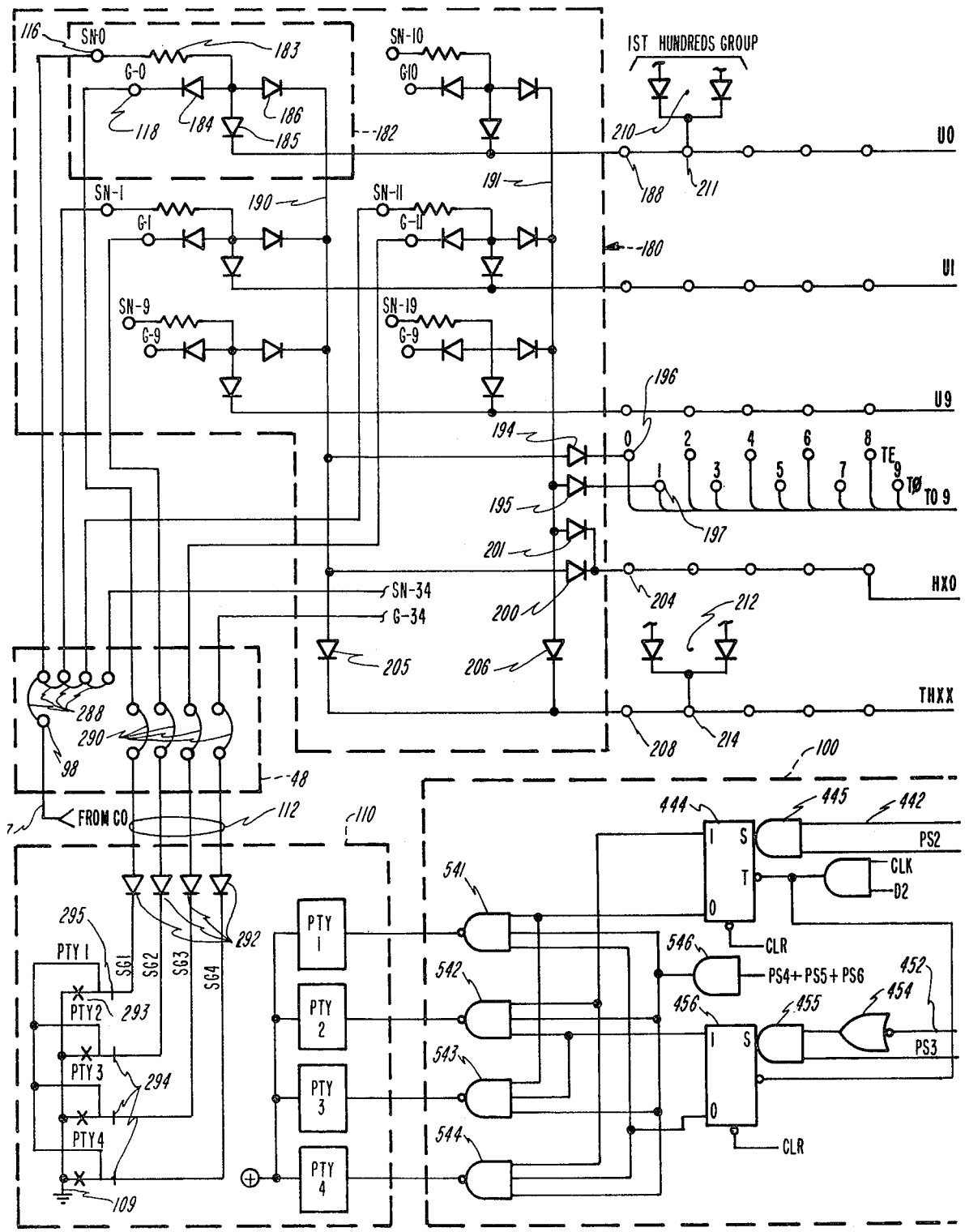

Referring now to composite FIG. 4, the identifier of FIG. 3 is shown in greater detail. To aid the reader during the ensuing description, parenthetical reference will be made to the literal designations of the individual sheets of the drawing forming the composite FIG. 4. Parenthetical reference will also be made to figures of the drawing other than the one at hand when momentary reference thereto is made. A further convention utilized in the following description assigns, where possible, the same reference number to the elements of FIG. 4 as used in FIG. 3 with literal designations added to distinguish between like multiple elements.

The matrix 50 (FIG. 3) is represented schematically in FIG. 4 (a,b) by a module 180 comprising a plurality of diode-resistor number elements 182 (twenty number elements 182 per module in the presently described embodiment). Each number element 182 includes the SN input terminal 116, the G terminal 118, a resistor 183, and three isolation diodes 184, 185, 186. The SN input terminal 116 of each of the elements 182 is connected through the resistor 183 and the isolation diode 184 to the G terminal 118 associated with the element. The SN terminal 116 is also connected through the resistor 183 and isolation diode 185 to a terminal 188 of a units bus (such as bus UO) associated by number with the particular element 182. Finally, the SN terminal 116 is connected through the resistor 183 and diode 186 to one of two high-order digits buses 190, 191. The matrix module 180 includes a pair of isolation diodes 194, 195 through which the high-order digits buses 190, 191 are connected respectively to an even tens digit terminal 196 and odd tens-digit terminal 197. The tens-digit terminals collectively are labeled in two groups TE and Tφ corresponding, respectively, to the even and odd numbered tens-digit terminals. The buses (such as the high-order digits bus 190) associated with number elements 182 having even-numbered tens-digit designations at their input SN terminals are thus connected through isolation diode 194 to an even-numbered tens-digit terminals TE. The buses such as bus 191 are similarly connected to the odd-numbered tens-digit terminals Tφ. The high-order digits buses 190, 191 are also connected through isolation diodes 200, 201 to a terminal 204 of a hundreds digit bus HX0, and through isolation diodes 205, 206 to a terminal 208 of a thousands digit bus THXX. The matrix module 180 includes twenty SN inputs 116 numbered SN-0 through SN-19. The corresponding number elements 182 may represent the directory numbers XX00 through XX19 in the telephone system of the presently described embodiment. Four other modules such as the module 180 are connected to the group of terminals designated collectively as the 1ST HUNDREDS GROUP in FIG. 4a. A portion of the second twenty-element module in the 1st hundreds group is represented by a diode pair 210 connected to terminal 211 of the zero units bus U0, and a second diode pair 212 connected to terminal 214 of the thousands digit bus THXX. The diodes 210 correspond to the diode 185 of the representative number element 182; the diodes 212 correspond to the diodes 205 and 206 of the representative matrix module 180. Five other modules such as the module 180 are connected to the terminals of each of the other hundreds groups 2ND–5TH (4b), to form a matrix subgroup comprising twenty-five modules having a total of five-hundred number elements such as the element 182.

The high-order digits busses 190, 191 of each of the groups of modules are connected to the respective hundreds bus, e.g., the buses 190, 191 of the third hundreds group are connected to the HX2 terminals. A hundreds-digit strapping field 218 is provided for selectively connecting the HX0-4 buses to five of the ten identifier input buses H0-9. A five-hundreds group strapping field 220 is provided for selectively connecting the THXX bus to one of twenty 500s subgroup buses 5H01-20. The buses 222 for the three low order digits of a second 500s matrix subgroup (not shown) identical to the 500s subgroup of FIGS. 4a, b are multipled to the U0-9, T0-9, and H0-9 buses, respectively, at representative terminals 224, 225, 226. The 500s buses 228 of the second 500s subgroup are carried separately as identifier input buses 5H21-40. Isolation diodes such as diodes 230 are provided for each of the buses for isolating the matrix subgroups each from the other.

FIG. 4a, b thus represents a "matrix gate" comprising two matrix subgroups having together 50 modules such as the module 180 and having a total of 1000 diode-resistor number elements such as the element 182. Other matrix gates may be multipled to the identifier input buses U0-9, T0-9, 5H01-40, e.g., at terminals 232, to provide number elements for up to 20,000 subscribers. The SN terminals 116 (4a) are selectively connected via a cross-connect field such as the cross-connect field 48 to the sleeve terminal 98 corresponding to the calling line. The crossconnection imparts directory number significance to the sleeve lead of the line so connected. Since in most modern telephone systems there is no regular correlation between the equipment number terminals and the directory number assigned to the line, the crossconnect field 48 provides a convenient means for assigning line directory numbers.

Returning now to FIG. 4(c), the units digit buses U0-9 are connected to a decimal-to-2/5 diode matrix 126u having five outputs U/0, U/1, U/2, U/4, U/7. A signal applied to one of the buses U0-9 traverses the matrix 126u and produces output signals in standard 2-out-of-5 format. For example, an input signal on bus U9 traverses the matrix via diodes 234, 236 to produce an output signal, respectively, on lines U/2 and U/7. The five output lines of the matrix 126u are connected to the inputs of corresponding pulse detectors 128u.

A typical one of the pulse detectors 128 (4c) is shown comprising an input resistor 238 connected at one end thereof to the U/0 line from the matrix 126u, and at the other end to a junction 240. The junction 240 is connected to ground through paralleled resistor 242, capacitor 243, and diode 244. The junction 240 is also connected through a 200 volt zener diode 245 (connected cathode-to-anode) to the base of an NPN transistor 246. The emitter of the transistor 246 is connected to ground; the base is connected to ground through a resistor 248. The collector of transistor 246 is connected through a resistor 250 to a +5 volt source 252, and to an output terminal 254. Typical component values are shown in FIG. 4c for the pulse detector U/0 in accordance with standard notation.

The output terminals of each of the detectors 128 are connected via NOT elements or inverters 256 to the J inputs of bistable elements such as the bistable 258 of the respective digit registers 138. The output signals of the detectors 128 are clocked into the digit bistables 138 by a CPM enabling signal generated in the timing and control unit 102 (FIG. 3).

The 5H01-40 buses (4c) are each connected directly to an input of a different one of the 40 pulse detectors PD01-40 comprising the 500s sub-groups detectors 130. The multiple output lines 255 of the pulse detectors 130 are connected through inverters 257 and via a bus 259 through inverters 258 (4c) (one inverter for each of the forty lines of the bus 259) as the TH01-40 signals to the thousands-digit strapping field 132. The ten output terminals 260 of the strapping field 132 are connected to the inputs of NAND elements 262–266 of the decimal to 2/5 translator 126a. The strapping field 132 along with the 500s subgroup strapping field 220 (4b) allow the selective assignment of any decimal digit in standard 2/5 format to any 500-terminal subgroup. For example, a strap 268 in the strapping field 220 and a strap 270 in the thousands digit strapping field 132 assign a thousands digit "4" to the representative matrix subgroup of FIG. 4(a, b). An identification signal on the THXX bus (4a, b) is transferred via the strap 268 and bus 5H03 to the pulse detectors 130. The enabled output of pulse detector PD03 is transferred via the inverters 257, 258 to a TH03 terminal 269. A low level signal on the TH03 terminal 269 is transferred via the strap 270 to the 260-4 terminal to enable NAND elements 262 and 265 of the translator 126a. The enabled output signals TH/0, TH/4 representative of a thousands digit "4" in standard 2/5 format are clocked by the CPM enabling pulse into the thousands digit bistable 138th for storage therein.

The multiple output signal lines 255 of the pulse detectors 130 are connected through inverters 257, 272 as the OC01-40 signals to an office code strapping field 134. The outputs of NAND elements 274a-h are connected to the set inputs of corresponding office code bistables OF1-8. An exemplary strap 276 (4c) connects the OC03 terminal 277 to an input terminal 278 of the NAND element 274h. Only one of the office code bistables OF1-8 will be set during an identifier operation since only one of the terminals OC01-40 of the strapping field 134 will carry an enabling signal. The enable outputs of the bistables OF1-8 are each connected to one input of each of a corresponding set of NAND elements 154 termed office code origin gates. Office code digits are assigned to particular 500s subgroups by connecting the enable output of the corresponding one of the office code bistables OF1-8 through the office code origin gates 154 and via the strapping field 156 to digit output NAND elements 280–284. Conversion to standard 2/5 format is done in the strapping field 156. When the enabling signals A, B and C are successively generated during outpulsing of the office code, the NAND element pairs A1-8, B1-8 and C1-8 corresponding with the enabled one of the OF1-8 bistables successively generate and pass office code signals via the strapping field 156 to the output NAND elements 280–284. For example, if bistable OF8 is enabled, NAND element pairs A8, B8 and C8 successively pass enabling signals via straps 286 to enable digit output NAND elements 280, 282; 280, 283; and 280, 283, thereby generating office code digits "244" in the standard 2/5 format.

By use of the strapping fields 220 (FIG. 4b), 132, 134 (FIG. 4c) and 136, (FIG. 4b) each subgroup of 500 number elements may be assigned any thousands digit and any one of eight different office codes. Two subgroups may be assigned the same thousands digit, but different office codes. One office code may also be assigned to two 500 number-element subgroups to provide a full complement of numbers for that matrix gate. It is evident from the foregoing description that the generation of the office code for any subgroup of 500 numbers is independent of the thousands-digit generation.

As previously described with reference to FIG. 3, a party detection test is performed during program steps 1–3. The automatic 4-party detector 100 of FIG. 3 is described in detail with reference to FIG. 4 (a, b). It is assumed that for the purpose of this description that four stations on a telephone line associated with the sleeve lead 97 are assigned directory numbers 4400, 4401, 4411 and 4434. The SN terminals of the number elements corresponding with the assigned numbers are connected, respectively, to terminals SN00, SN01, SN11 and SN34 of the crossconnect field 48. Crossconnect straps 288 connect the sleeve lead 97 from the central office, from its terminal 98 in the crossconnect field 48, to each of the terminals corresponding with the number elements SN00, SN01, SN11 and SN34. G terminals G00, G01, G11 and G24 of the exemplary number elements are connected to corresponding terminals which may be in the crossconnect field 48. It is further assumed that the four parties on the exemplary line are, respectively, party 1, party 2, party 3 and party 4. The SG bus 112 comprises in the presently described embodiment four party buses SG1-4 having corresponding terminations which may be in the crossconnect field 48. Alternatively, the party buses SG1-4 may have terminations on the matrix gate modules for strapping to the number element disabling or G terminals 118. Straps 290 connect the party bus to the appropriate G terminal for parties 1–4. The SG1-4 buses are connected through solation diodes 292 to the contacts of party gating relays PT1-4 of relay module 110. One of the relays PT1-4 is energized during the party detection test to apply a ground 109 to the three G terminals of the on-hook parties. For example, if the party test determines that party 1 is the calling station, relay PT1 is energized to apply the ground 109 via the normally open contacts 293 and the normally closed contscts 294 of the PTY2-4 relays to number-element terminals G01, G11 and G34. The G terminal G 00 of the off-hook calling station is left floating or unconnected by the opening of normally-closed contact 295 of relay PTY1.

Figure 7:
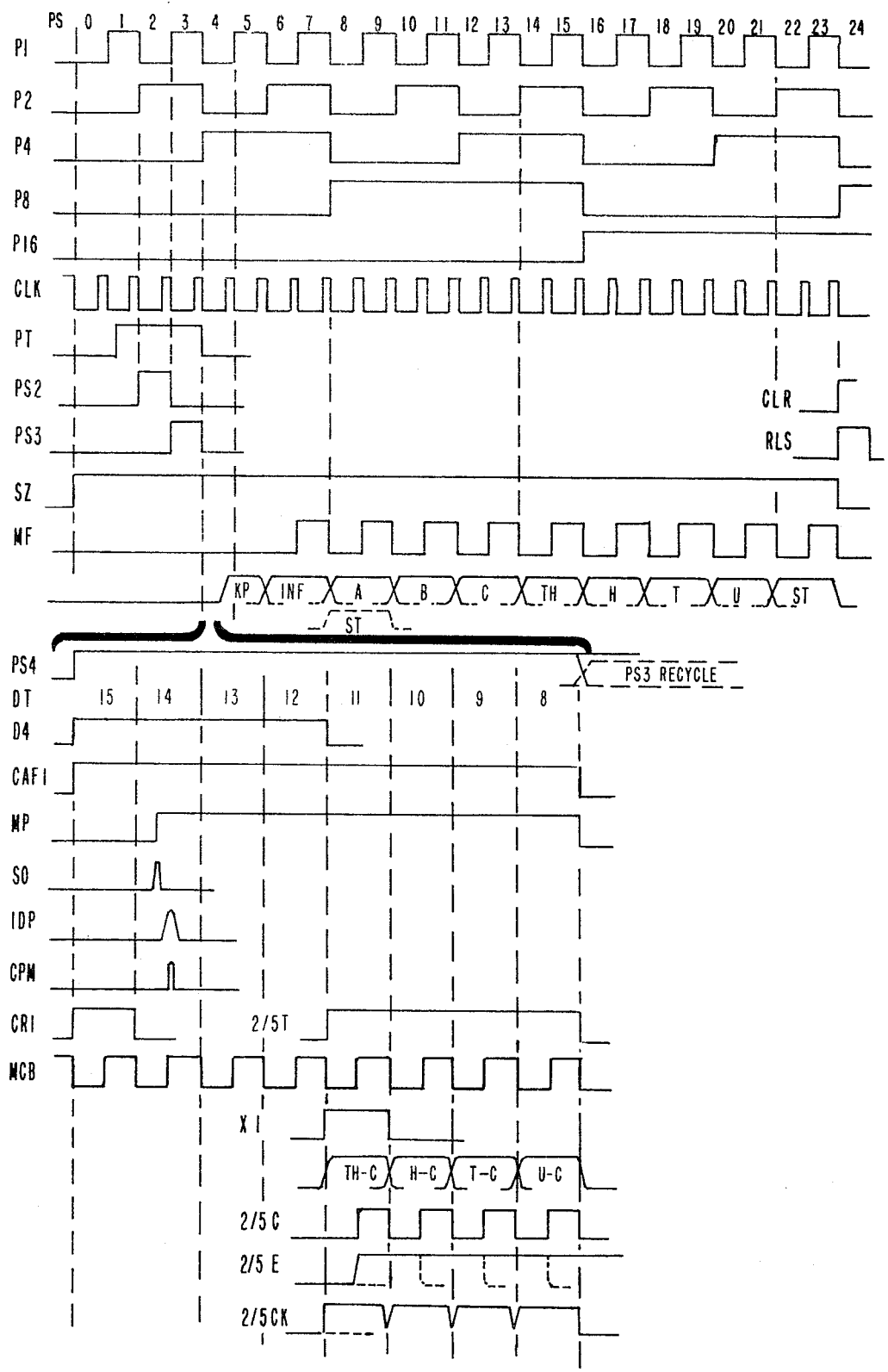
FIG. 7 is a timing diagram of the identifier operation.

FIG. 7 is a timing diagram showing the various signals generated by the binary divider 106, program counter 108 and the timing and control unit 102 (FIG. 3). Program steps PS0-24 as determined by the decoding of the program counter output signals P1, P2, P4, P8 and P16 are displayed along the top of FIG. 7. Each program step is 68 milliseconds in duration. The time periods generated by decoding the outputs D1, D2, D4, D8 of the binary divider 106 (FIG. 3) are displayed in part in FIG. 7 as the DT15-8 periods, each having a duration of 4.25 milliseconds. Clock signal CLK occurs every 68 milliseconds and has a duration of 17 milliseconds.

Referring now to FIG. 4 (b) in conjunction with the timing diagram FIG. 7, the automatic four-party detector 100 includes a negative-current detector 410, a positive-current detector 412 connected via normally open relay contacts NPT 446 and PPT 436 to the tip T and ring R of a telephone line 414. The line 414, connected through the central office switching 122 and the trunk circuit 34 to the identifier of FIG. 4, may be a four-party line having connected thereto conventional telephone stations 401–404 designated respectively as parties 1–4 (PTY1-PTY4), and which stations 401–404 are modified in accordance with the present invention. Only the portions of the stations 401–404 necessary to explain the operation of the present invention are shown in FIG. 4. Each of the stations 401–404 includes a hookswitch 416 illustrated in the on-hook position. The party 2 station 402 is modified to include a connection from a normally-open hookswitch contact 418 through a resistance 420 to ground. The party 3 station 403 is modified to include a connection from normally open hookswitch contact 422 to the anode of a diode 424 connected anode-to-cathode through a resistance 426 to ground. The party 4 station 404 is modified to include a connection from normally open contact 428 to the cathode of a diode 430 connected cathode-to-anode through a resistance 432 to ground. In the party 1 station 401, normally open hookswitch contact 434 is left open. During the party test period of the program (signal PT, FIG. 7), signal PS2 from timing and control unit 102 actuates a negative party test relay NPT, via a NOT element 435 whereupon the tip T and ring R leads of the line 414 are shorted together through normally open contacts 446 and connected via normally closed contacts 438 of relay PPT and lead 440 to the negative current detector 410. The negative current detector senses the presence of negative current in the line, e.g., as would occur with either party 2 or 4 off-hook. In response to a detection of negative current on the line 440 the detector 410 enables output line 442 which in turn conditions the set input 445 of a negative-party bistable 444 to be set at CLK-D2 time. If substantially no current is detected in the line 440, for example if either party 1 or 3 is off-hook, the output line 442 remains high and the negative party bistable 444 remains disabled.

The negative current detector 410 is disconnected from the line at the end of program step 2, PS2, by the release of relay NPT. During program step 3, relay PPT is actuated by the PS3 signal (FIG. 7) to again short the tip and ring conductors of the line 414 together through normally-open contacts 436 and connect the shorted line via contacts 448 of the PPT relay and an input lead 450 to the positive current detector 412. The detector 412 senses the presence of positive current on the input lead 450, e.g., as would occur with either party 2 or 3 off-hook. In response to a detection of positive current, the detector 412 disables output line 452 which in turn enables NOT element 454 to condition the set input 455 of a positive-party bistable 456 to be enabled at CLK-D2 time of PS3. If substantially no current is detected on the input lead 450 by the detector 412, as for example when either party 1 or 4 is off-hook, the bistable 456 remains disabled.

The construction and operation of the negative and positive current detectors 410, 412 are described with reference to FIGS. 8 and 9. The negative current detector 410, FIG. 8, includes a resistor 460 connected between the input line 440 and a junction 461, the latter being connected to ground through a capacitor 462. A resistor 463 is connected between junction 461 and a junction 464. The junction 464 is connected directly to the base of an NPN transistor 466, through a capacitor 467 to ground and through a resistor 468 to a source 470 of current which may be, e.g., a −48 vdc power supply. The source 470 is connected through a resistor 471 and a diode 472 connected anode-to-cathode to the base of the transistor 466. The emitter of the transistor 466 is connected directly to the anode of diode 472 and through a resistor 473 to ground. The resistor 473 is bypassed by a capacitor 465 to ground. The collector of the transistor 466 is connected through a resistor 474 to a junction 475. The junction 475 is connected directly to the base of a transistor 476, through a diode 478 connected cathode-to-anode to ground, and through a resistor 480 to a source 482 of current which may be e.g., a +5 vdc power supply. The emitter of transistor 476 is grounded; the collector is connected directly to the output line 442 and through a resistor 484 to the source 482. Typical component values are shown on FIG. 8.

In operation, when the input line 440 is open (party 1 off-hook) or connected to the anode of a diode (such as the diode 424, FIG. 4b) to ground (party 3 off-hook), the transistor 466 is held off, driving current into the base of transistor 476 via the resistor 480. Transistor 476 conducts applying ground or low level to the output lead 442. When a ground is detected on the input lead 440, e.g., as when either station 402 or 404 (FIG. 4b) is off-hook, the negative bias on the base of the transistor 466 exceeds the negative bias on the emitter thereof and the transistor 466 conducts. The current drawn by the transistor 466 through the resistor 474 pulls the base of transistor 476 to a low level (approximately −0.7 volts) due to the diode 478 drop, turning transistor 476 off and allowing the output lead 442 to rise to high level through resistor 484.

The input to lead 440 is filtered by a filter network 485 comprising resistor 460, capacitor 462, and resistor 463 capacitor 467 to eliminate false response of the circuit 412 due to line 414 noise. The response time of the filter network 485 lengthens the response time of the detector 410, to up to 50 milliseconds; however, the bistable 444 (FIG. 4a) is not clocked until time period DT3 of PS3, or 51 milliseconds after the start of program step 3.

Figure 4B:
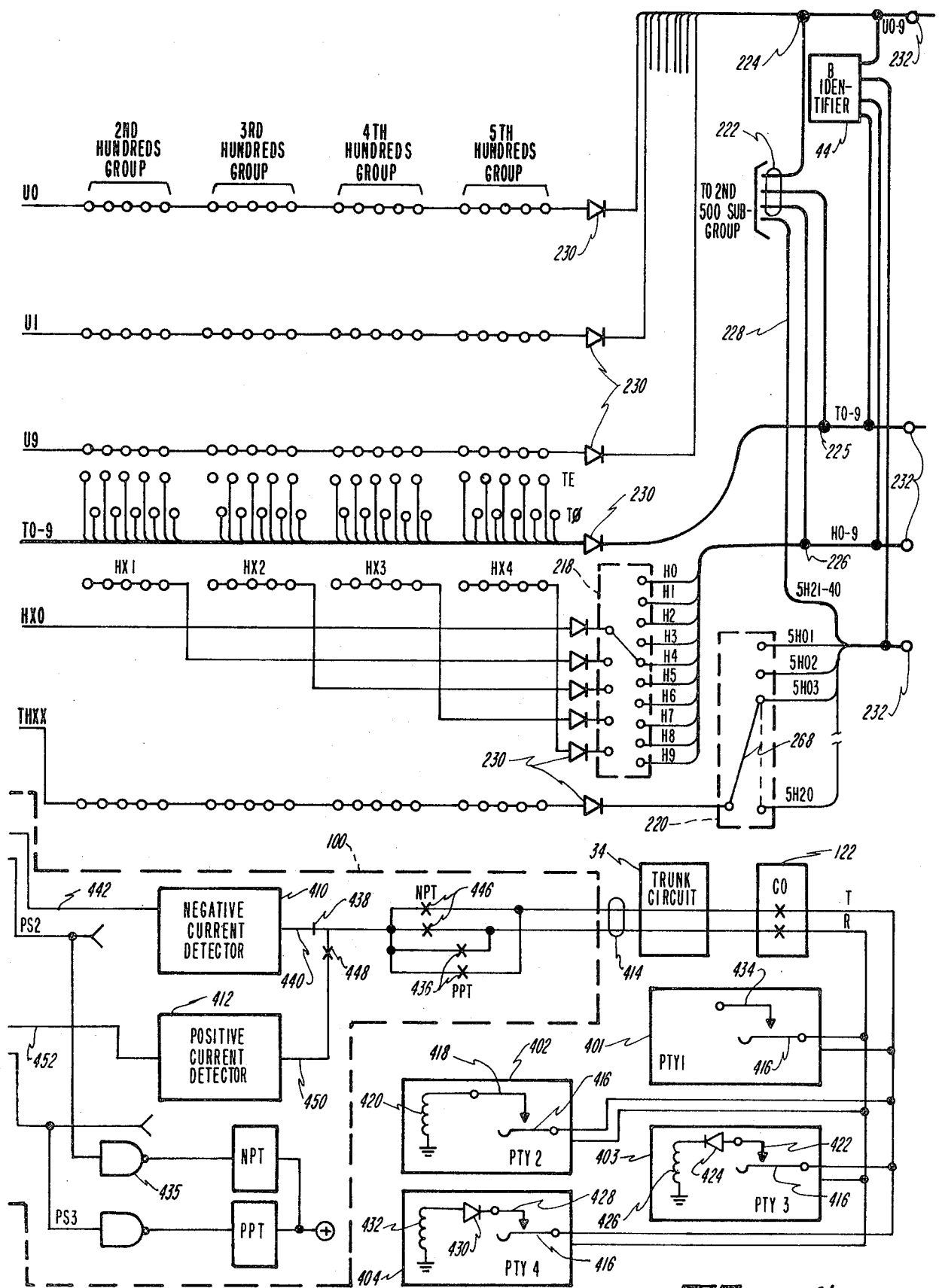
Figure 9:
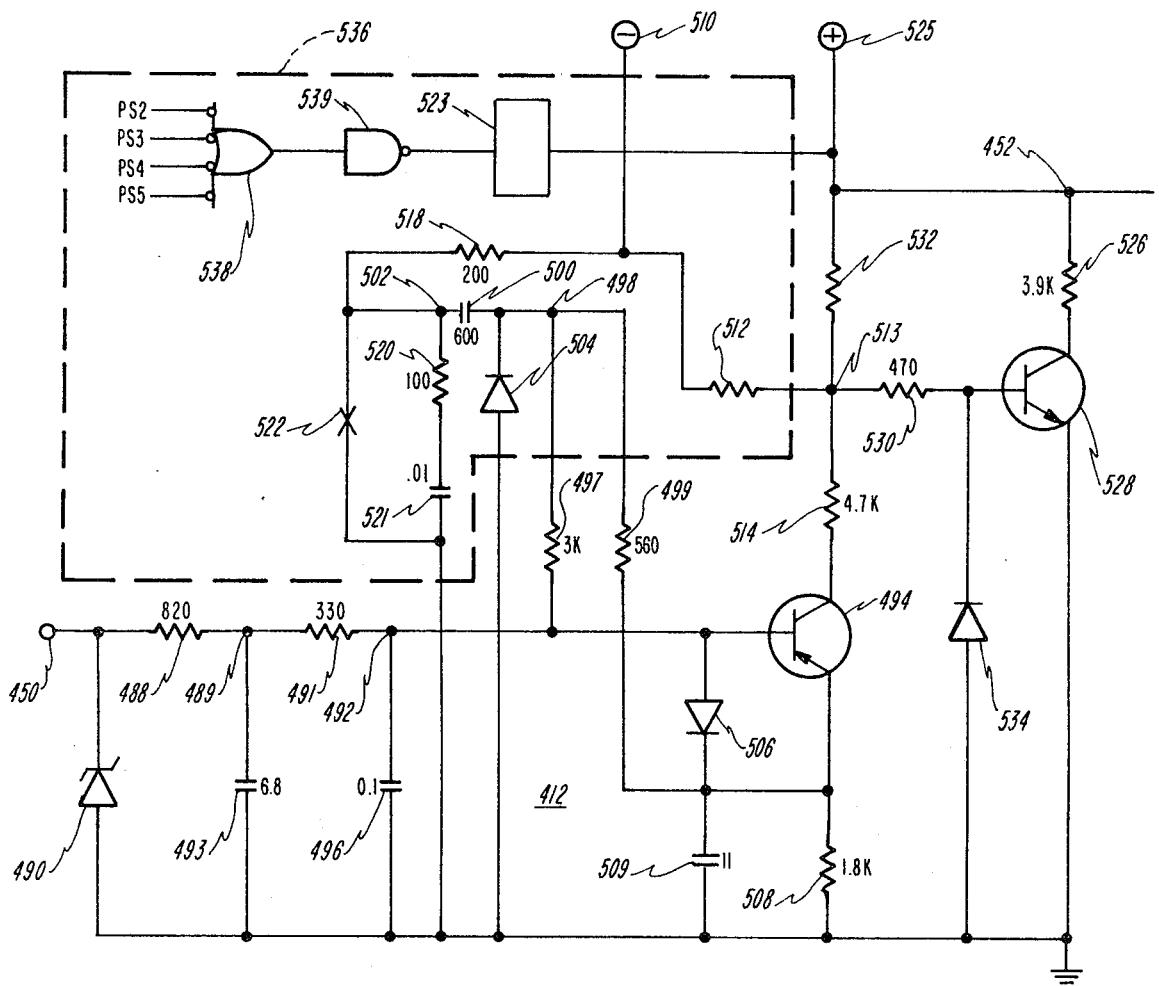

Referring now to FIG. 9, the positive party detector 412 of FIG. 4b is shown in detail. Input lead 450 is connected through a resistor 488 to a junction 489 and to the cathode of a 68v zener diode 490 connected cathode-to-anode to ground. The junction 489 is connected through a resistor 491 to a junction 492 and through a capacitor 493 to ground. The junction 492 is connected directly to the base of a PNP transistor 494 and through a capacitor 496 to ground.

The base junction 492 is connected through a resistor 497 to a junction 498 which in turn is connected through a resistor 499 to the emitter of the transistor 494, through a capacitor 500 to a junction 502, and through a diode 504 connected cathode-to-anode to ground. The emitter of transistor 494 is connected to the cathode of a diode 506 having an anode connected to the base junction 492 of the transistor 494. The emitter of transistor 494 is connected through a paralleled resistor 508 and capacitor 509 to ground. A current source 510 such as a −48 vdc power supply is connected through a resistor 512 to a junction 513, which in turn is connected through a resistor 514 to the collector of transistor 494. The source 510 is also connected through a resistor 518 to the junction 502. The junction 502 is connected through a series resistor 520 and capacitor 521 to ground. The resistor 520 and capacitor 521 are shunted by a direct connection through normally open contacts 522 of a relay 523. A current source 525 such as a +5v logic power supply is connected through a resistor 526 to the collector of an NPN transistor 528. The base of the transistor 528 is connected through a resistor 530 to the junction 513 which in turn is connected through a resistor 532 to the source 525. The emitter of the transistor 528 is connected to ground; the base, to the cathode of a diode 534 connected cathode-to-anode to ground. Typical component values are shown on FIG. 9.

Figure 8:
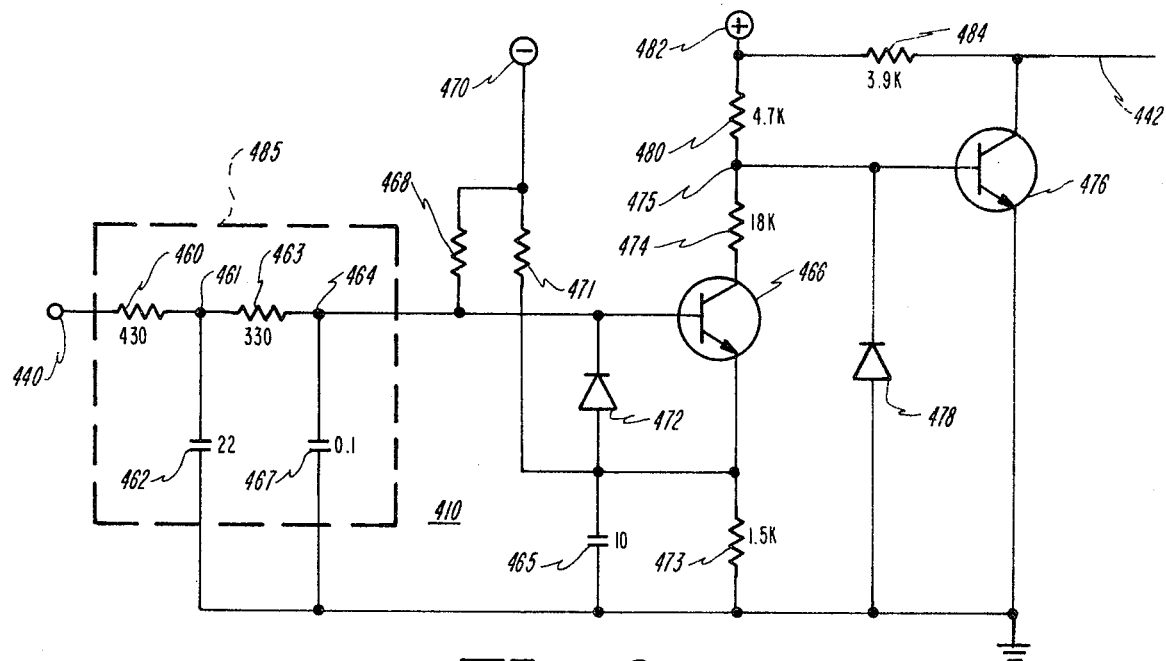
FIGS. 8 and 9 are schematic details, respectively, of the negative and positive current detectors.

From inspection of the circuit 412 of FIG. 9, it is evident that the construction and operation of the circuit 412 is similar to the negative current detector 410 of FIG. 8. The major difference between the circuits 410, 412 is the reversal of polarities of the input portion of the circuits whereby the PNP transistor 494 is provided in the positive current detector 412. A positive current source 536 for operation of the PNP transistor 494 is provided by charging the capacitor 500 from the negative source 510 prior to PS2, and then effectively reversing the polarity of the capacitor 500 by actuating the relay 523. At PS2, NAND elements 538, 539 supply a ground to actuate the relay 523. Thus, during the subsequent operating period of the detector 412, program step 3, ground is applied to the junction 502 through the normally-open contacts 522 of actuated relay 523. The capacitor 500 then serves as a positive current source to operate PNP transistor 494 should a ground appear on the input line 450. If the input line 450 remains open during PS3, e.g., as when either station 401 or 404 (FIG. 4b) is off-hook, the diode drop of diode 506 back biases transistor 494 to hold it off. When transistor 494 is not conducting transistor 528 is also held off by the negative potential at junction 513. With the transistor 528 off, a high level is applied to the output line 452 through the resistor 526. When a ground is detected on the input lead 450, e.g., as when either station 402 or 403 is off-hook, the base of transistor 494 is pulled down to less positive potential than the emitter, causing transistor 494 to conduct. When transistor 494 conducts base current is supplied to transistor 528 via resistor 530 and the transistor 528 conducts applying ground to the output lead 452. With the output lead 452 at low level (see FIG. 4a) the NOT element 454 supplies a high level to the input 455 of the positive-party bistable 456 as previously described.

Returning now to FIGS. 4a and 7, commencing with program step 4, NAND elements 541–544 are supplied an enabling signal by an AND element 546 to decode the outputs of the negative and positive-party bistables 444, 456. One of the NAND elements 541–544 will supply a ground for actuating a corresponding one of the party-gating relays PTY1-4. With the appropriate G terminals of the on-hook parties grounded through the contacts of the PTY1-PTY4 relays, an identification pulse applied to the SN lead 97 of FIG. 4(a) will traverse only the number element of the off-hook party.

The generation of the identification pulse occurs in program step 4 and is described with reference to FIGS. 7 and 4 (e,f). Program step 4 is expanded in part in the lower portion of FIG. 7 to display more clearly the first position DT15-8 thereof when the ID pulse is generated and detected, and the contents of the digit registers 138 are checked for vality in accordance with the standard 2-out-of-5 format.

Figure 4D:
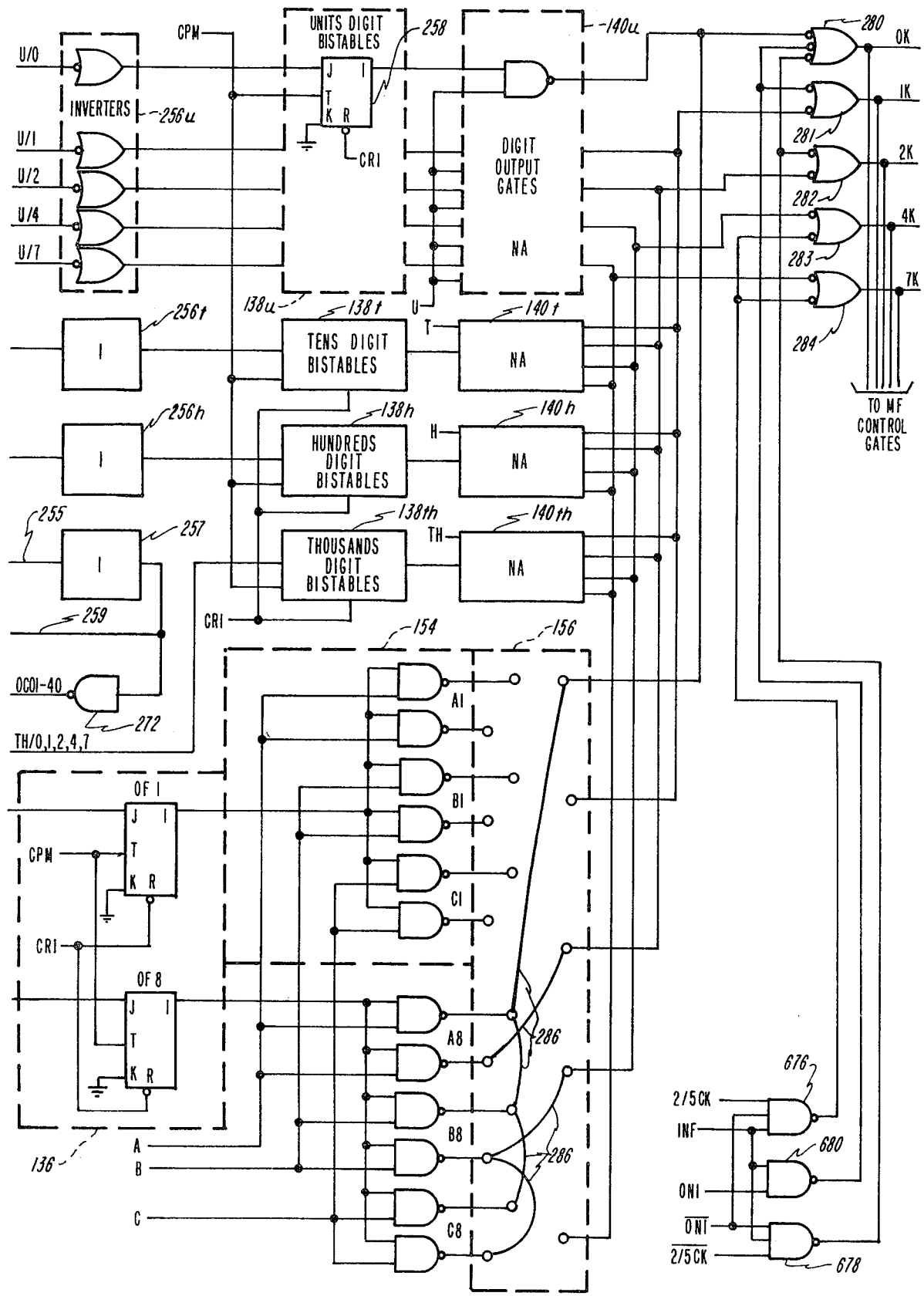
Figure 4F:
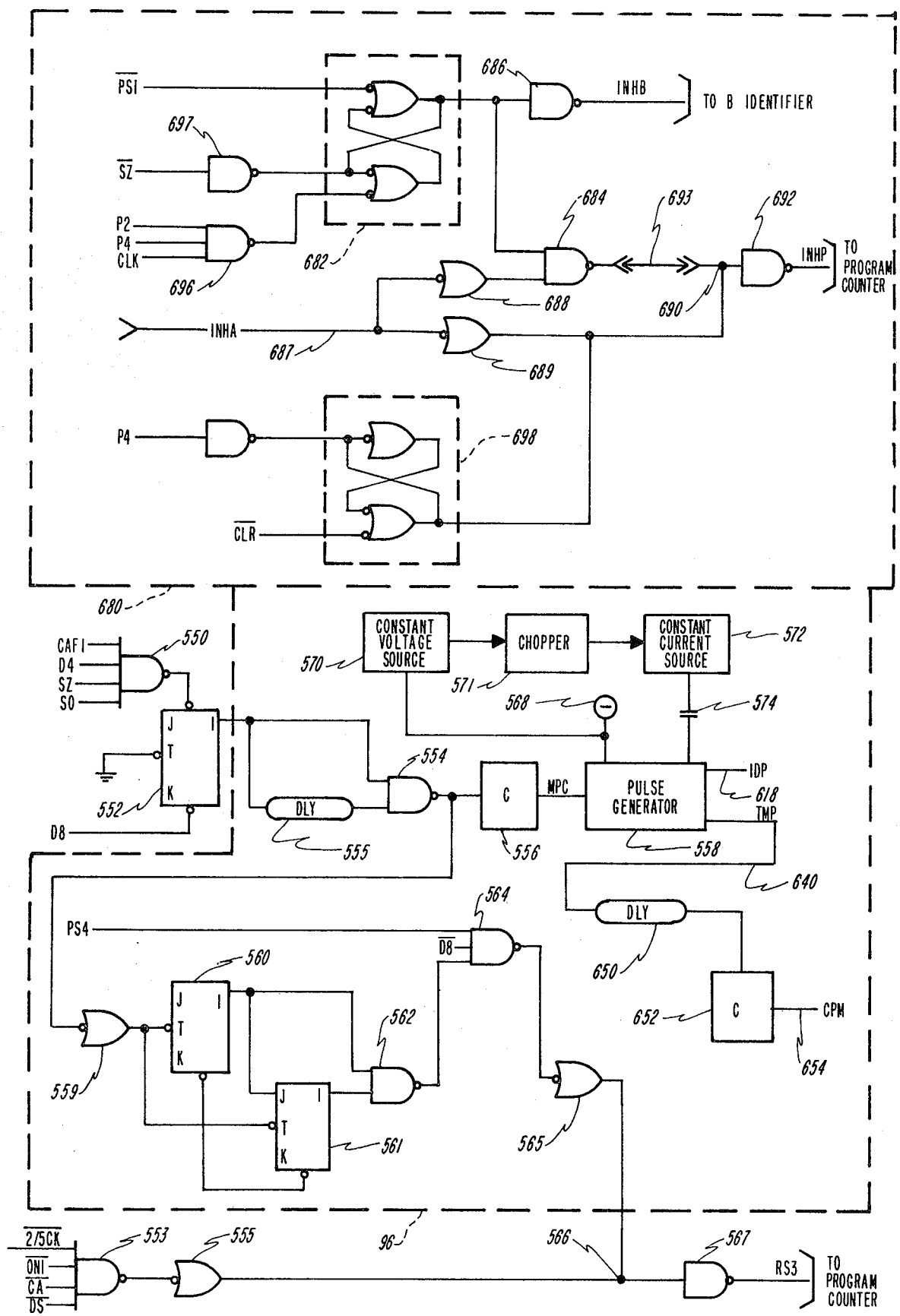

Referring to FIG. 4f, the ID pulse generator 96 of FIG. 3 is shown in greater detail. A NAND element 550, upon the generation of an SO synchronization signal, supplies an enabling signal to set an MP bistable 552 in the timing and control unit 102 (FIG. 3). The generation of the SO signal in the synchronization circuit 94 of FIG. 3 is described in another portion of the present specification. The SO signal will normally occur during the first two time periods DT15, 14 of program step 4. The enabled output of the MP bistable 552 is applied directly to one input of a NAND element 554 and to another input thereof via a delay unit 555. The output of NAND element 554 is applied through a signal converter 556 as an MPC signal to the input of a pulse generator 558. The converter 556 converts the logic level output signal of NAND element 554 to an office-battery (e.g., −48 vdc) level signal. The MPC signal is pulsed to ground for approximately 4 milliseconds to initiate the firing of the ID pulse as described hereinafter. The MP bistable 552 is reset at time DT7 by the low level D8 signal to recondition the bistable for receipt of the next enabling signal. The output of NAND element 554 is also applied via a NOT element 559 to the clock inputs T of a pair of bistables 560, 561. The normally low level set outputs of the bistables 560, 561 generate a high level output from a NAND element 562. A NAND element 564 is thus inhibited (high level output) prior to program step 4 by the PS4 signal and during the first half of PS4 by the $\overline{D8}$ signal. Accordingly, at time DT7 of PS4 the NAND element 564 will be enabled to generate a negative going signal applied to a NOT element 565. A positive-going signal will thus be applied to a junction 566 at the input of a NOT element 567. A negative-going signal at the output of the NOT element 567 forms a clock signal RS3 for recycling the program counter (108, FIG. 3) from PS4 to PS3. If, however, a $\overline{2\text{-}5CK}$ signal at one input of a NAND element 553 is a low level at time DT7 of PS4, a low level will be maintained at the junction 566 by the output of a NOT element 555 and a negative going signal RS3 will not be generated. A low level $\overline{2\text{-}5CK}$ signal indicates a successful 2/5 validity test of the contents of the digit registers 138 (FIG. 3), consequently, recycling to PS3 is not required.

Consider now, the alternative of 2/5 test failure in which instance the $\overline{2\text{-}5CK}$ signal is a high level at time DT7 of PS4. A positive going transition at the junction 566 is not inhibited by the NOT element 555 and the RS3 signal is generated to recycle the program to PS3, so to generate another ID pulse when PS4 is re-entered. When program step 4 is re-entered, the register clear CR1 signal resets the digit registers 138 and the 2/5CK bistable 666 to condition them for receiving new data. When the first identification is attempted the bistable 560 is set via the NOT element 559. Upon a first retry (second ID pulse generation during the same program) the bistable 560 is reset and bistable 561 set. When the generation of a third ID pulse is initiated during the same program, both bistables 560, 561 are enabled and a low level signal is generated by the NAND element 562. The NAND element 564 is thus inhibited at DT7 time of PS4 and the junction 566 remains at low level and the program is allowed to proceed through the second half of PS4. The other inputs $\overline{ONI}$, $\overline{DS}$, $\overline{CA}$ of NAND element 553 are normally high level, and indicate special service markings when low. The markings indicate, respectively, operator number identification required, denied service, and PBX cancel. Any low signal input to the NAND element 553 will inhibit recycling the program to PS3.

The ID pulse generator 96 of the presently described embodiment utilizes the office battery (such as a −48 vdc supply 568) to derive −38 vdc in a constant voltage source 570. The source 570 output drives a chopper 571 the output of which is stepped up to 290ν. The chopper 571 output is rectified in a constant current source 572, and the output utilized to charge a pulse capacitor 574. The MPC signal initiates the discharge of the pulse capacitor 574 to generate an ID pulse and an TMP timing signal in the pulse generator 558.

Figure 10:
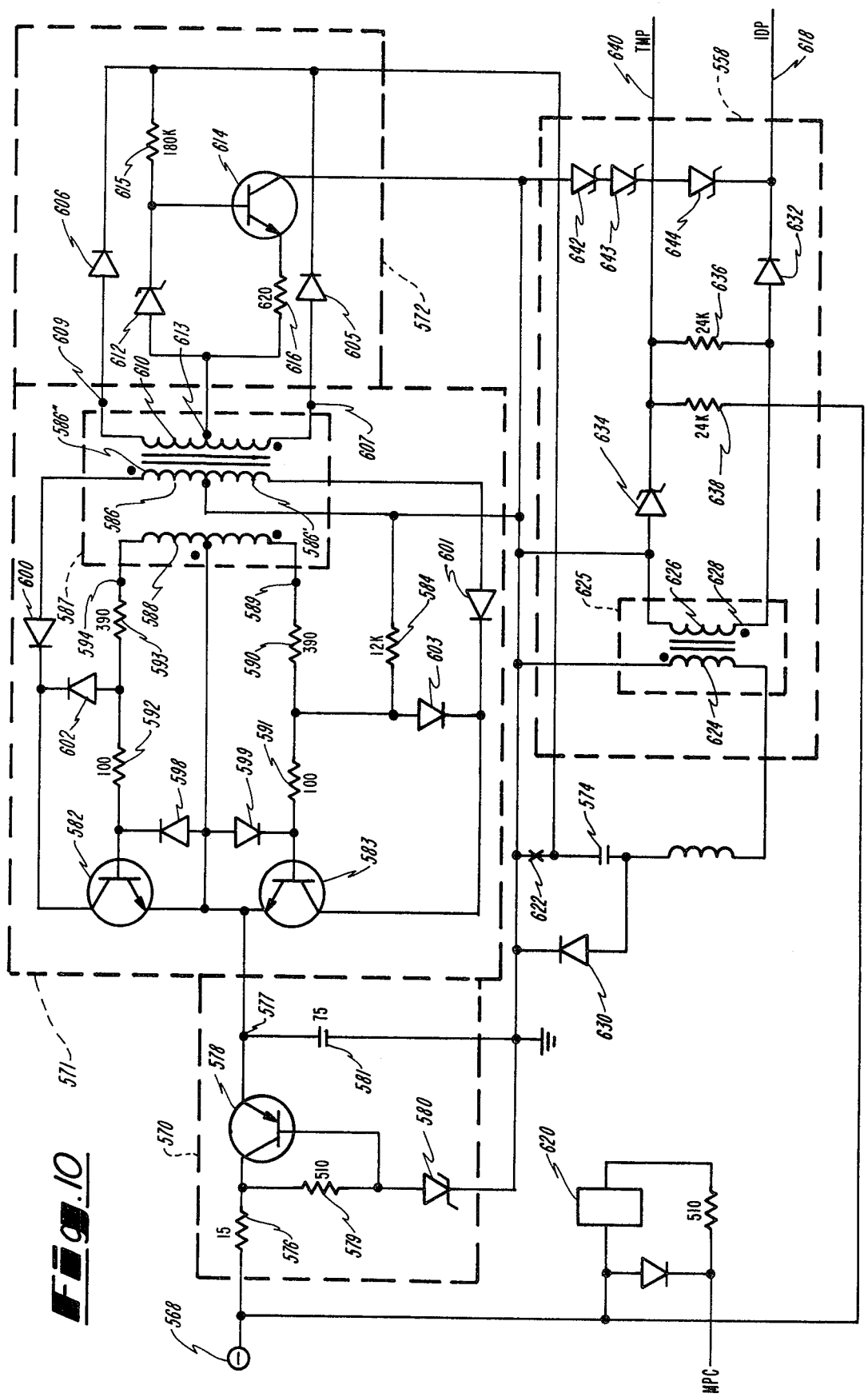
FIG. 10 is a schematic detail of the identification pulse generator.

Referring now to FIG. 10 for a more detailed description of the arrangement, operation, components and structure of the ID pulse generator, the chopper 571 is driven by −38 vdc potential present at a junction 577 of the constant voltage source 570. The −48 vdc source 568 is applied through a current limiting resistor 576 to the collector of a PNP transistor 578. A resistor 579 and a zener diode 580 having a zener voltage of −39 vdc establish a reference potential at the base of transistor 578. The transistor 578 supplies current for operation of the chopper 571 at its emitter terminal 577. A capacitor 581 to ground is utilized for filtering.

The chopper 571 comprises two NPN transistors 582, 583 having their collectors connected to a primary winding 586 of a transformer 587. A feedback winding 588 is connected from a terminal 589 thereof through resistors 590, 591 to the base of transistor 583. The base of transistor 582 is connected through resistors 592, 593 to a terminal 594 of the feedback winding 588. A starting resistor 584 ensures that transistor 583 will conduct when power is applied. The transistor 583 conducting supplies current through the winding 586' causing terminal 589 to rise to +8ν and drive more current into the base of the transistor 583. Terminal 594 of the feedback winding 588 will consequently be at −8ν, reverse biasing the base-emitter junction of transistor 582. When the transformer 587 saturates, no further energy will couple to the feedback winding 588 and transistor 583 will turn off causing a negative voltage to appear at terminal 589 and a positive voltage at terminal 594. The transistor 582 consequently turns on, and transistor 583 being reversed biased turns off. Transistor 582 conducting drives current through winding 586" to produce a +8ν drive at terminal 594 of the feedback coil 588 and −8ν at terminal 589. When the transformer 587 saturates with maximum current in the winding 586", the transistor 582 will turn off and transistor 583 will turn on. The chopper 571 continues to operate in accordance with the sequence of operation described above. The resistors 592, 593 and 591, 590 provide the on and off bias paths, respectively, for transistors 582 and 583. Diodes 598, 599 hold the reverse bias voltage of the transistor 582, 583 bases to less than −1 vdc. Diodes 602, 603 prevent the transistors 582, 583 from fully saturating. Diodes 600, 601 prevent a voltage from appearing at the collectors, respectively, of transistors 582, 583 which voltage is more negative than the emitter voltage.

The transformer 587 steps up the voltage appearing at the primary winding 586 to approximately 290ν. The chopper 571 output is rectified by diodes 605, 606 having anodes connected, respectively, to terminals 607, 609 of the transformer 587 secondary winding 610, and cathodes connected to the pulse capacitor 574. The constant current source 572 comprises a 12ν zener diode 612 having its anode connected to the center tap 613 of secondary winding 610, and its cathode connected directly to the base of an NPN transistor 614. The base of transistor 614 is also connected through a resistor 615 to the pulse capacitor 574. The collector of transistor 614 is grounded; the emitter, connected through a resistor 616 to the center tap 613. The current source 572 regulates the charging current of pulse capacitor 574 to 20 milliamps. Approximately 12 volts (controlled by zener diode 612) is applied across the resistor 616 and maintained only when the capacitor 574 is charging. When the pulse capacitor 574 is fully charged, all current flow through the zener diode 612. The pulse capacitor 574 charges in approximately 45 milliseconds.

The generation of the ID pulse on an output lead 618 of the pulse generator 558 is controlled by the MPC signal which is pulsed to ground for approximately 4 milliseconds as previously described. A relay 620 energizes when the MPC signal supplies a ground thereto, closing normally open contacts 622 to provide a ground to the pulse capacitor 574. When the contacts 622 close, −290ν is applied to a primary winding 624 of a pulse transformer 625, producing approximately 300ν at terminal 628 of the transformer 625 secondary winding 626. A diode 630 prevents negative overshoot on the output terminal. A diode 632 having its anode connected to the terminal 528 and its cathode connected to the output lead 618 prevents positive voltage from entering the secondary winding 626 and also prevents current flow from negative voltages up to 1 volt which may be on the sleeve lead to which the output lead 618 is connected. A network comprising a 5.1ν zener diode 634 and resistors 636, 638 provides the +5 vdc TMP logic signal at an output lead 640 when the ID pulse appears on the output lead 618. Initially, the diode 634 is forward biased from current flow through the resistor 683 connected from the cathode of diode 634 to the −48 vdc source 568. The diode 634 having its cathode connected to the MPT output lead 640 normally clamps the MPT lead to −0.7 volts. When the ID pulse is fired by actuating the relay 620, the current through the resistor 636 is overcome by the current through the resistor 638 driving diode 634 to its zener voltage. Reference zener diodes 642, 643, 644 having zener voltages, respectively, of 75ν, 75ν and 220ν, and connected in series from ground (anode) to the ID pulse output lead 618 (cathode), are provided to limit the voltage from the pulse generator 558 to 350 volts. The diodes 642, 643, 644 will conduct if the tributary office with which the identifier of the present invention operates has no RC network connected to the sleeve lead.

Returning now to FIG. 4f, the output lead 618 of the pulse generator 558 is connected through the trunk circuit 34 and the central office switching 122 (FIG. 3) to the sleeve lead 97 (FIG. 4a) of the line being identified, as previously described with reference to FIG. 3.

The timing relationship of the ID pulse with respect to the tributary office is controlled by the SO synchronization signal as described hereinafter in another portion of the specification. The time delay in the ID pulse generator 96 between the presentation of the SO signal at the input to the NAND element 550 and the generation of the ID pulse on the output line 618 is approximately 2.0 milliseconds. The ID pulse has an amplitude of 300 volts and a duration of about 200 microseconds. The TMP signal appearing on output line 640 is utilized to signal the identifier that an ID pulse is being fired and will appear at the matrix gate outputs. The TMP signal is applied through a delay unit 650 and a signal regenerator 652 to an output lead 654 as a CPM timing pulse. The CPM timing pulse has a duration of 10 microseconds and is generated to occur at approximately the center of the detected ID pulse as it appears at the inputs of the digit registers 138 (FIG. 4d). Referring to FIG. 4c, and the typical pulse detector U/0, when the ID pulse appears at the inputs of the pulse detectors 128, 130, the zener voltage of the diode 245 is overcome driving current into the base of the transistor 246. The transistor 246 conducting applies ground to the output terminal 254 and a high level at the J input of the bistables 258 associated with buses presenting an ID pulse for detection. At approximately the midpoint of the duration of the high level signal applied to the bistables 258, the CPM timing pulse is generated to clock the bistables 258 and store the detected indicia representative of the calling party directory number.

Referring now to FIGS. 4e and 7, at time DT11 of PS4 the identifier program proceeds to check the validity of the indicia stored in the digit registers 138 by the generation of a 2/5 test signal from NAND elements 656, 658. During the time when the 2/5 T signal is enabled a clock signal 2/5C is generated from NAND elements 660, 662 in response to control signal MCB from the timing and control unit 102 (FIG. 3). An X1 signal from a NAND element 663 of the timing and control unit 102 combines in NAND element 664 with a high level 2/5E signal from the 2/5 test logic 142 to enable a 2/5 check bistable 666 at DT11 time of PS4. The 2/5CK bistable 666 is set during time DT11 by the 2/5 clock if the 2/5E signal is a high level. If, however, the 2/5E signal remains low during DT11 time the bistable 666 will remain reset as indicated by the dashed-line representation of the 2/5E and 2/5CK signals at time DT11 of FIG. 7. The 2/5E signal is generated during time DT11 by clocking the outputs of the thousands digit bistables 138th (FIG. 4d) through digit-output NAND elements 140th and 280–284 into the 2/5 test logic 142 with a TH-C signal. The TH enabling signal applied to the thousands digit output NAND elements 140th is generated as the TH-C signal by the X1 input to NAND element 667 during DT11 of PS4, and again as the TH signal to gate the thousands digit to the MF control gates 144, during PS14, 15 by the input from NAND element 669.

Inspection of the 2/5 test logic 142 of FIG. 4e shows that any two of the input leads 0K, 1K, 2K, 4K, 7K at a high level, with the other three inputs at a low level will enable a high level from each of the output NAND elements 700–705 onto the 2/5E output lead 668. If the 2/5E output lead 668 is at a high level during the subsequent DT10, 9, 8 periods of PS4 when the H-C, T-C and U-C signals are generated, the reset input 670 of the 2/5CK bistable 666 is held disabled by NOT element 672. The 2/5CK bistable 666 remaining set through time DT8 to DT7 of PS4 inhibits recycling of the program to PS3 as previously described. The 2/5CK bistable enabled during PS6, 7 (signal INF enabled), with no special marking indicating that operator number identification is required (ONI signal) enables NAND elements 283, 284, (FIG. 4d) via a NAND element 676 to generate a "0" information digit, signals 4K and 7K. The transmittal of a "0" INF digit to the CAMA office signals that a calling subscriber identification has been successfully executed and the subsequently generated digits (A, B, C, TH, H, T, U) will form the calling subscriber's directory number. The MF signal generated during each odd numbered program step beginning at PS7 enables the MF control gates 144 to actuate the MF switching relays in the well known manner.

The $\overline{2/5CK}$ signal enabled during PS6, 7 (INF) generates via NAND element 678 the signals 0K, 2K, from NAND elements 280, 282 indicating an information digit "2" or ANI failure. In the event of ANI failure or an ONI requirement (generated by a NAND element 680) the program generates the ST signal in the MF control gates during PS8, 9 as indicated by the dashed-line representation of the ST signal on FIG. 7.

The simultaneous operation of two identifiers in accordance with the present invention is achieved by providing a dual operation lockout circuit 680 (FIG. 4f) in each of the two identifiers. Two identifiers may operate simultaneously without mutual interference if the elements common to the two identifiers viz., the number element matrices, are utilized on a time-sharing basis by the two identifiers. If both identifiers require access to the matrix in order to transmit an ID pulse therethrough, the program of one of the identifiers is briefly suspended under control of the lockout circuits 680 while the other utilizes the matrix. Subsequently, both programs continue autonomously to perform their respective operations. The lockout circuit 680 of the identifier generating an ID pulse is active during the early portion of the program (PS0-6) to ensure that the other identifier does not respond to the pulse. During the outpulsing portion of the program (PS4/DT7-PS24) the lockout circuit functions to prevent a hesitation in its program in response to the lockout circuit of the other identifier.

Referring now to FIG. 7 and 4e, f, the generation of the program signals PS1-PS4 in the timing and control unit 102 (FIG. 3) is represented in FIG. 4e, respectively, by NAND elements 706–709. For example, the program counter (108, FIG. 3) outputs $\overline{P16}$, $\overline{P8}$, $\overline{P4}$ are applied along with the enabled SZ bistable signal to a NAND element 712, the output of which is applied through a NOT element 713 to the NAND elements 706–708. The output signal of NOT element 713 is enabled during PS0-3, and the NAND elements 706-708 decode the P1 and P2 program counter signals to generate the $\overline{PS1}$-$\overline{PS3}$ signals. During PS2, the CR1 signal is generated via NAND elements 716, 718 from the NAND element 707 output and a DT15 signal from NAND element 720, NOT element 721. The CR1 signal functions to reset the 2/5CK bistable and the office code and digit registers 136, 138. During PS4, the CR1 signal is again generated from the NAND element 716 unless the high level output from the NOT element 721 is inhibited by the enabled output of the 2/5CK bistable 666 applied via NAND element 724.

The lockout circuit 680 is activated during program step 1. Referring to FIGS. 4e, f and assuming identifier A of FIG. 4 is seized by a trunk circuit, a tie-back NAND bistable 682 is enabled at the beginning of program step 1 by the $\overline{PS1}$ signal from NAND element 706. The enabled output of the bistable 682 is transferred to one input of a NAND element 684 and to a NOT element 686. The output of NOT element 686 is transferred by a wiring connection to identifier B 44 (FIGS. 1 and 4b) as an INHB inhibit or lockout signal. An INHA lockout signal received from the B identifier 44 on input line 687 is assumed to be a high level indicating that the B identifier 44 is, at the presently described time, inactive for dual operation purposes. The high level INHA signal from identifier B is applied through NOT elements 688, 689 to produce a low level signal at the other input of NAND element 684 and at a junction 690 at the input of a NOT element 692. A jumper wire 693 is connected only in the presently described A identifier; in all other respects the circuit 680 is identical in both A and B identifiers. A low level at the junction 690 produces a high level signal at the output of NOT element 692. A low level or negative going INHP signal transferred to the program counter 108 (FIG. 3) disables the program counter outputs P1, 2, 4, 8 holding the programs at PS0. While the identifier thus inhibited is held at PS0, the active identifier proceeds to transmit an ID pulse through the matrix gates common to both identifiers. If the A and B identifiers are both seized by different trunk circuits and simultaneously initiate their respective identification programs, the INHA signal will be low at the input line 687 at approximately the same instant the lockout circuit 680 of FIG. 4f generates an INHB signal from the NOT element 686. Accordingly, the NAND element 684 will generate a low level signal which is transferred via the jumper wire 693 to the junction 690 to override the high level output of the NOT element 689. Identifier A will thus proceed with the identification program; the B identifier 44, not having a jumper wire corresponding to the wire 693 of the A identifier, will be inhibited from executing an identification program by its INHP signal. The INHB signal will remain at the output of NAND element 686 until the bistable 682 is reset via NAND element 696 at CLK time of PS6, after the A identifier has executed ID pulse generation, detection and the 2/5 validity test during the first half of PS4. Alternatively, the bistable 682 may be reset via a NAND element 697, should the SZ seize bistable be reset. A bistable 698 is set by the P4 signal (at PS4) to prevent the generation of an INHP inhibit program signal in response to an INHA signal from the B identifier 44 during the period from PS4 to the generation of the $\overline{CLR}$ program clear signal. At the latter named time (program step 24) the active identifier will have completed outpulsing the stored number of the calling subscriber.

Figure 6:
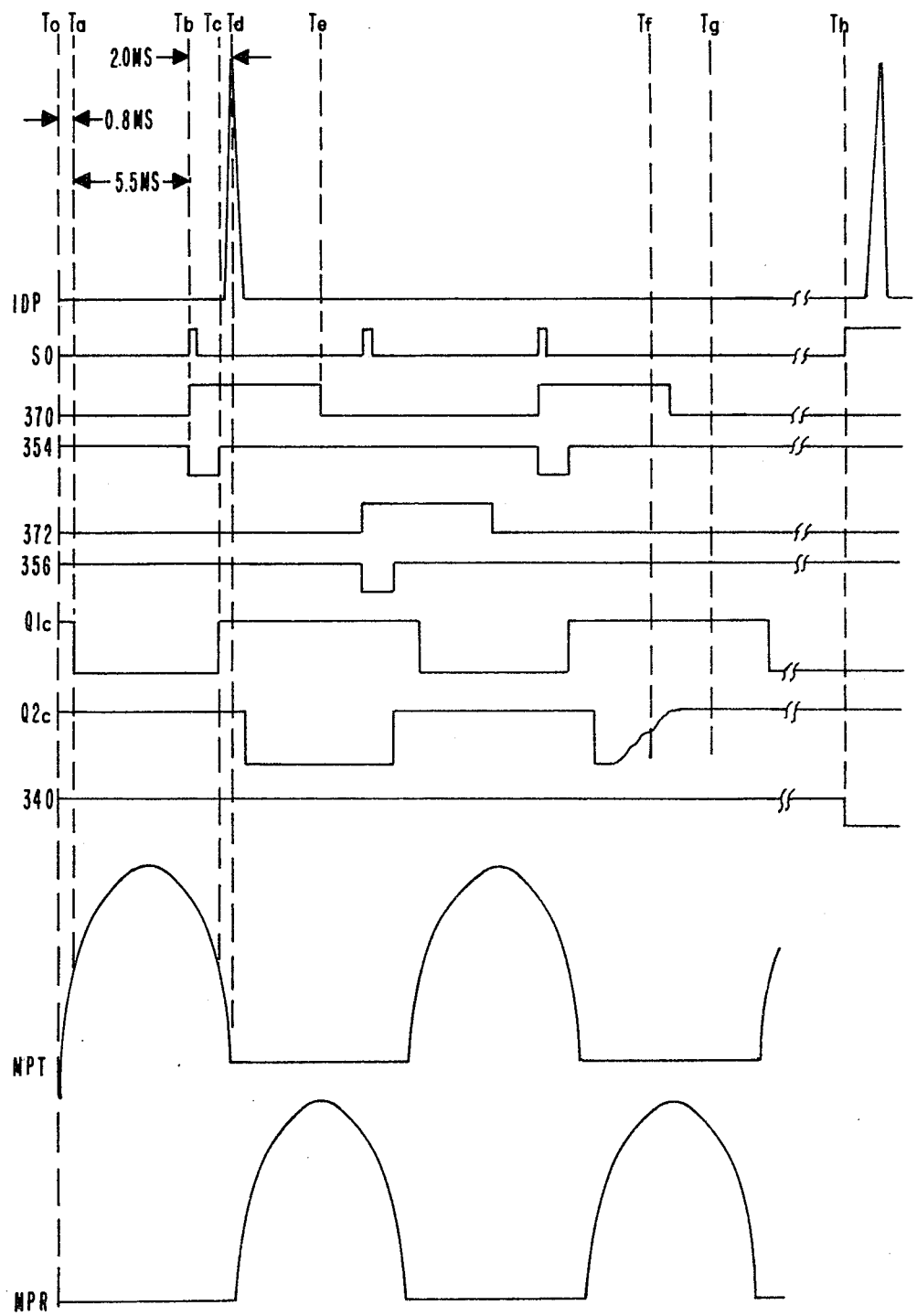
FIG. 6 is a timing diagram of the relationship between the message metering signal and the identification pulse.

In some tributary offices such as a No. 5 crossbar office, there may be a local message register connected to the sleeve wire. It is common in such offices for a message metering signal to appear on the sleeve lead. Referring to FIG. 6, typical message metering pulses MPA and MPB comprising alternate half cycles of a full-wave rectified 60 Hz signal and having a peak amplitude of 170 volts are shown. When the identification pulse is applied to the sleeve lead, as previously described with reference to FIG. 4, there is a possibility of interference from the message metering signal if the ID pulse is generated at the same time the MPA or MPB pulse is of sufficient amplitude, about 85 volts or more in the presently described embodiment, to trigger the detectors in the identifier. By generating the ID pulse during a low amplitude portion of the metering signal, interference from the metering signal is prevented. The synchronization circuit 94 of FIG. 3 in combination with the ID pulse generator 96 achieve this end.

Figure 5:
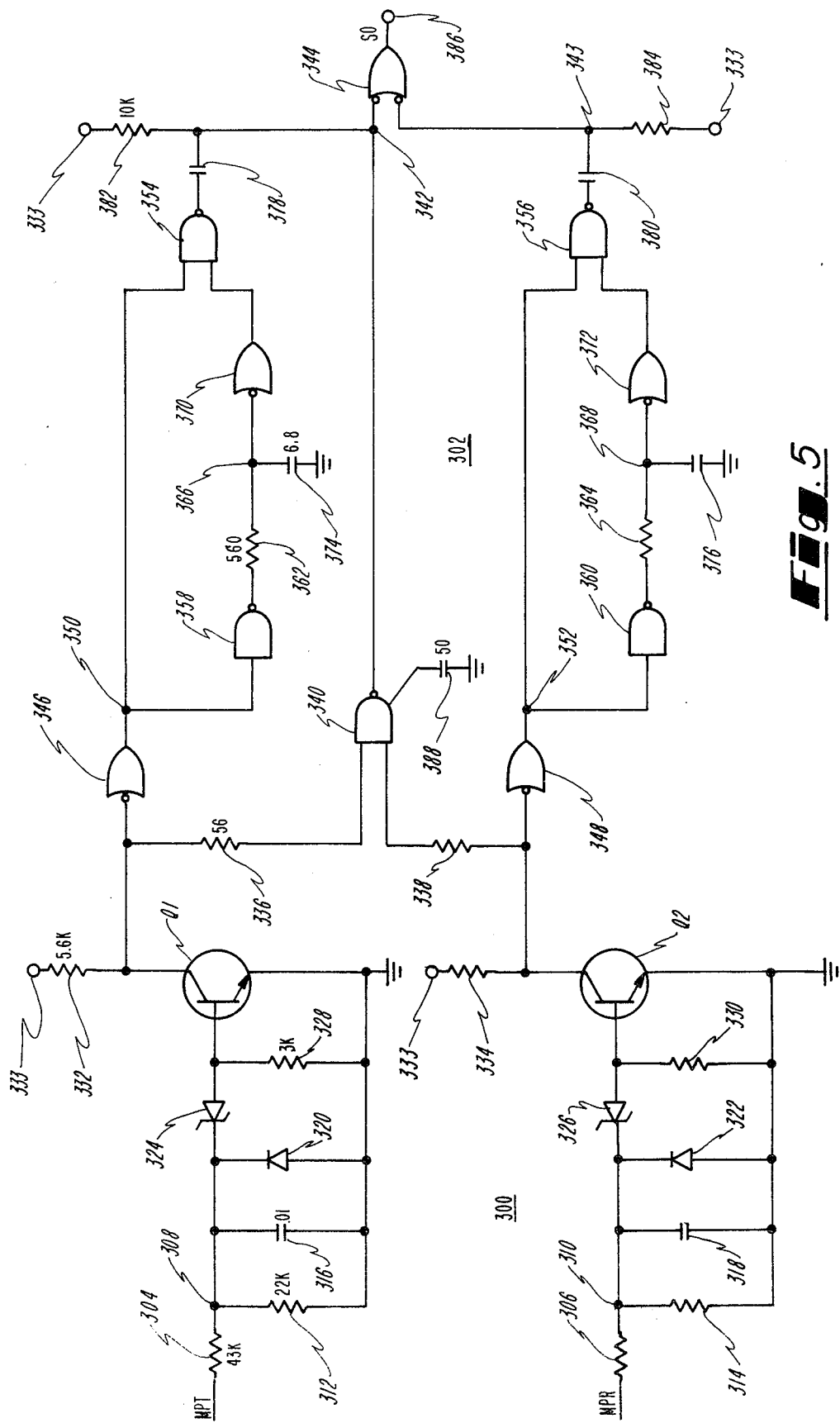
FIG. 5 is a schematic detail of the identification pulse synchronization circuit.

Referring now to FIG. 5, the synchronization circuit 94 of FIG. 3 is shown in schematic detail. The circuit of FIG. 5 comprises generally an analog portion 300 and a digital portion 302. The analog portion 300 detects the voltage level of the input message metering pulses MPT, MPR and actuates the logic elements of the digital portion 302. An output signal SO of the digital portion 302 is utilized by the ID pulse generator (96, FIG. 3) to generate an ID pulse in timed relationship with the metering signals MPT, MPR.

It is evident from viewing FIG. 5 that both the analog and digital portions comprise two identical legs, an MPT leg and an MPR leg. Accordingly, the ensuing description, where appropriate, limns only one of the two identical circuits, but includes characters of reference to both circuits shown in FIG. 5. Typical component values are shown in accordance with standard practice for one of the identical circuits.

Lines MPT and MPR are each connected, respectively, through an input resistor 304, 306 to a junction 308, 310. The junction 308, 310 is connected to ground through a resistor 312, 314, a capacitor 316, 318 and a diode 320, 322 connected cathode-to-anode to ground. The junction 308, 310 is also connected to the cathode of a 12 volt zener diode 324, 326. The anode of the zener diode 324, 326 is connected directly to the base of an NPN transistor Q1, Q2 and through a resistor 328, 330 to ground. The emitter of the transistor Q1, Q2 is connected to ground; the collector, through a resistor 332, 334 to a common positive current source 333, which may be, e.g., a positive 5 volt source.

The collectors of transistors Q1 and Q2 are each connected, respectively, through resistors 336 and 338 to input terminals of a NAND element 340. The output of the NAND element 340 is connected to a junction 342 which in turn is connected to one input of the two-input NAND element 344. The collector of each of the transistors Q1, Q2 is connected to respective NOT elements 346, 348. Again, the description will continue as for a single one of the two identical circuits with characters of reference to both circuits. The output of the NOT element 346, 348 appears at a junction 350, 352 which is connnected to one input of a NAND element 354, 356. The junction 350, 352 is also connected to the input of a NOT element 358, 360, the output of which is connected through a resistor 362, 364 to a junction 366, 368. The junction 366, 368 is connected to the input of a NOT element 370, 372 and through a capacitor 374, 376 to ground. The output of the NOt element 370, 372 is connected as a second input to the NAND element 354, 356. The output of the NAND element 354, 356 is connected through a capacitor 378, 380 to a junction 342, 343. The junction 342, 343 is connected through a resistor 382, 384 to the common plus 5 volt source 333. The terminal 343 is connected to the NAND element 344 as the second input.

Referring now to FIG. 5 in conjunction with FIG. 6, the metering pulses MPT and MPR are applied from a signal source (not shown) in the tributary office to the inputs of the respective legs of the analog portion 300 of the sync circuit of FIG. 5. Assuming that the MPT signal is the first applied (time To), when the amplitude of the MPT ssignal reaches approximately 50 volts (Ta) the zener diode 324 will begin conducting driving current into the base of Q1. The collector of Q1 is forced to ground, applying a ground to the inputs of NOT element 346 and NAND element 340. The output of NOT element 346, a high level signal at terminal 350, is applied to the input of NOT element 358 and to one input of NAND element 354. The output of NOT element 358 is driven to ground or low level by the high level input signal, allowing the capacitor 374 to discharge. In the presently described embodiment, the delay of the RC network comprising resistor 362 and capacitor 374 plus the inherent logic element circuit delays combine to provide a delay of approximately 5.5 milliseconds. When terminal 366 reaches a potential which is the threshold potential of NOT element 370, the output of NOT element 370 changes to a high level, disabling NAND element 354 (Tb). The resulting transition from high to low level at the output of NAND element 354 is coupled via the capacitor 378 to the terminal 342 at the input of the NAND element 344. Because of the time constant of the capacitor 378 and resistor 382, NAND element 344 is enabled for approximately 100 microseconds by the low level output of NAND element 354. The enabled NAND element 344 generates an SO output signal at terminal 386. The SO signal is utilized by the ID pulse generator (96, FIG. 3) as an enable signal to generate an identification pulse (IDP, FIG. 6).

When the amplitude of the MPT pulse drops below approximately 50 volts (Tc, FIG. 6) Q1 turns off applying a low level to the input of NOT element 358 and to one input of NAND element 354. This allows capacitor 374 to begin charging to high level voltage and enables a high level at the output of NAND element 354. The total delay from the beginning of pulse MPT (To) to the generation of the ID pulse (Td) is 8.3 milliseconds as shown in FIG. 6. As previously described with reference to FIG. 4, the 2 millisecond delay from Tb to Td occurs in the ID pulse generator circuits. When capacitor 374 charges to the input threshold level of the NOT element 370, the output of NOT element 370 returns to low level (Te). Two circuit legs are provided in order to allow for recovery time of the timing circuits and to enhance the fail-soft capability of the synchronizer as described below. The foregoing description with reference to the MPT leg of FIG. 5 applies as well to the circuits of the lower portion of FIG. 5, the MPR leg.

"Fail-soft" capability is defined as the ability of a system such as a telephone system to function in spite of the failure of certain components or units of the system. The continued functioning of the system after component or unit failure may be at reduced speed or capacity. Fail-soft operation is provided in accordance with one aspect of the present invention in the synchronization circuit and ID pulse generator of the presently described embodiment of the invention by continued generation of ID pulses after failure of the synchronization circuit. Referring still to FIGS. 5 and 6, if the MPR leg of the analog portion 300 fails, e.g., as illustrated at Tf of FIG. 6 by the transition of the Q2 collector voltage to a high level, the SO signal which normally occur at time Tg will consequently not appear at the output terminal 386. The MPT leg of the synchronization circuit will continue, however, to produce SO output signals corresponding with the MPT signal as previously described. Should the failure mode of the MPR leg produce a constant low level output from NAND element 356, no SO signal would be produced by that leg because the AC coupling to the final stage 344 through the capacitor 380 requires a voltage transition to enable the NAND element 344. If both the MPT and MPR legs of the analog portion 300 fail, neither transistor Q1 nor Q2 will conduct and a high level will be applied through resistors 336 and 338 to the inputs of a NAND element 340. A capacitor 388 to ground connected in the circuit of NAND element 340 delays the generation of a low level output of that element for approximately 4 milliseconds. Should one of the high level inputs go low, e.g., as during normal operation just after time Td of FIG. 6 when $Q2_c$ goes low, the output of NAND element 340 will remain at a high level. At time Th, FIG. 6, NAND element 340 is disabled by high level inputs of duration longer than 4 milliseconds. The low level output of NAND element 340 enables NAND element 344 and the SO signal goes permanently to a high level. The SO signal being permanently high allows the ID pulse to be generated without regard to the message metering signal MPT, MPR. The presence of other positive voltage activity on the sleeve lead coincident with the ID pulse may degrade operation by causing the pulse detectors to indicate falsely; however, proper operation is not precluded by failure of the synchronization circuit.

While the principles of the invention have now been made clear in an illustrative embodiment, there will be immediately obvious to those skilled in the art, many modifications of structure, arrangement, proportions, the elements, materials, and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. Improved automatic number identification apparatus in a telephone system of the type having:
   a central office;
   a plurality of subscriber lines connected to said central office, each of said subscriber lines having
   a sleeve lead associated therewith in said central office;
   at least two outgoing trunk circuits in said central office;
   means in said central office for connecting the sleeve lead associated with one of said plurality of subscriber lines initiating a call to one of said outgoing trunk circuits, said connecting means functioning further for connecting said sleeve lead associated with another of said plurality of subscriber lines initiating a call to another of said outgoing trunk circuits;
   a plurality of number elements, at least one of said plurality of number elements each associated with one of said plurality of subscriber lines and connected to said sleeve lead associated therewith; and
   a plurality of directory number digit buses, said plurality of number elements each so connected through isolation means to said digit buses that a signal issuing from any one of said number elements appears simultaneously on preselected ones of said digit buses to form indicia thereon representative of a unique directory number associated with said any one number element;
wherein the improvement comprises:
an identifier unit having said plurality of directory number digit buses connected thereto;
another identifier unit having said plurality of directory number digit buses connected thereto;
means for connecting the sleeve lead associated with one said subscriber line initiating a call from said one outgoing trunk circuit to said identifier unit; and
means for connecting the sleeve lead associated with said other subscriber line initiating a call from said other outgoing trunk circuit to said other identifier unit;
each of said identifier units including:
a control means,
means responsive to said control means during an identification time period for generating an identification signal for application to said sleeve lead connected thereto,
means responsive to said control means during said identification time period for disabling said generating means of the alternate identifier unit, and
means responsive to said control means during said identification time period for storing said indicia appearing on said number element buses in response to said identification signal applied.

2. The automatic number identification apparatus as claimed in claim 1, said identifier units further comprising:
means responsive to said control means after said identification time period for inhibiting said disabling means.

3. The automatic number identification apparatus as claimed in claim 1, wherein
said disabling means of said identifier unit includes means responsive during said identification time period to said disabling means of said other identifier unit for inhibiting said disabling means of said other identifier unit.

4. The automatic number identification apparatus as claimed in claim 1, further comprising:
means responsive to said control means during said identification time period for testing the contents of said storage means for a valid representation of a directory number; and wherein
said control means includes means responsive to a test failure determined by said testing means for repeating said identification time period.

5. The automatic number identification apparatus as claimed in claim 4, further comprising:
means for counting the number of identification signals generated by said generating means during successively repeated identification time periods; and
said control means including means responsive to said counting means for inhibiting said repeating means.

6. Improved automatic number identification apparatus in a telephone system of the type having:
a central office;
a plurality of subscriber lines connected to said central office, each of said subscriber lines having a sleeve lead associated therewith in said central office;
at least two outgoing trunk circuits in said central office;
means in said central office for connecting the sleeve lead associated with one of said plurality of subscriber lines initiating a call to one of said outgoing trunk circuits, said connecting means functioning further for connecting said sleeve lead associated with another of said plurality of subscriber lines initiating a call to another of said outgoing trunk circuits;
a plurality of number elements, at least one of said plurality of number elements each associated with one of said plurality of subscriber lines and connected to said sleeve lead associated therewith;
a plurality of directory number digit buses, said plurality of number elements each so connected through isolation means to said digit buses that a signal issuing from any one of said number elements appears simultaneously on preselected ones of said digit buses to form indicia thereon representative of a unique directory number associated with said any one number element,
wherein the improvement comprises:
a first identifier unit having said plurality of directory number digit buses connected thereto and having an idle state and a busy state;
a second identifier unit having said plurality of directory number digit buses connected thereto and having an idle state and a busy state;
second means associated with each of said trunk circuits for connecting said sleeve lead associated with said subscriber line initiating a call connected thereto to said first or said second identifier unit in said idle state;
each of said identifier units including:
a control means having means therein responsive to said second connecting means for changing the state of said identifier unit from idle to busy, said identifier unit executing an identification program while in said busy state;
means responsive to said control means during said program for applying an identification signal to said connected sleeve lead;
means in said first identifier unit responsive to said control means therein during said program of said first identifier unit for delaying said program of said second identifier unit;
means in said second identifier unit responsive to said control means therein during said program of said second identifier unit for delaying said program of said first identifier unit; and
means responsive to said control means during said program for storing said indicia appearing on said number element buses in response to said identification signal applied to said connected sleeve lead.

7. The automatic number identification apparatus as claimed in claim 6, further comprising:
said delaying means of said first identifier unit including means responsive to said delaying means of said second identifier unit during said program of said first identifier unit for inhibiting said delaying means of said second identifier unit.

8. The automatic number identification apparatus as claimed in claim 6, further comprising:
means connected to said storing means for sensing the validity of the contents of said storing means, said sensing means generating an error signal in response to an invalid representation of a directory number in said storing means;

bistable means in said control means for storing said error signal during said program; and means responsive to said error signal stored in said bistable storing means for recycling said program.

9. The automatic number identification apparatus as claimed in claim 8, further comprising:

a counter responsive to said control means for recording said identification signal during successive cycles of said program; and a NAND element, responsive to a predetermined count of said counter, for producing an output signal inhibiting said recycling means.

10. Number identification apparatus in a telephone system, comprising:

a central office;

a plurality of subscriber lines connected to said central office, each of said subscriber lines having:

a sleeve lead associated therewith in said central office;

at least two outgoing trunk circuits in said central office;

means in said central office for connecting the sleeve lead associated with one of said plurality of subscriber lines initiating a call to one of said outgoing trunk circuits, said connecting means functioning further for connecting the sleeve lead associated with another of said plurality of subscriber lines initiating a call to another of said outgoing trunk circuits;

a plurality of number element, each having a preselected directory numeral assigned thereto, at least one of said plurality of number elements each associated with a different one of said plurality of subscriber lines, said plurality of number elements assembled in nesting groups of $x^{1,2 \cdots n-1}$ number elements where $x$ is the radix of a directory number representation and $n$ is the number of digits in said number representation, each of said number elements in any one of said groups having said preselected directory numeral assigned thereto including like numerals of significance $x^{1,2 \cdots n-1}$ in the corresponding positional representation of said preselected directory numeral assigned thereto, each of said number elements having:

an input terminal for connection to said sleeve lead associated therewith, a first output lead connected through an isolation device to said input terminal, and a second output lead connected through a second isolation device to said input terminal;

$x^{0,1 \cdots n}$ buses, each of said $x^{0,1 \cdots n}$ buses having $x$ lines, each of said $x$ lines of any of said $x^{0,1 \cdots n}$ buses having a digit value of said number representation, said first output lead of each of said plurality of number elements connected to one of said $x$ lines of said $x^0$ bus having said digit value of said number representation corresponding to the numeral of the least significant position of said directory numeral assigned;

a high-order digit bus for each of said $x^1$ groups connected to said second output lead of each of said number elements in said group, said high-order digit bus connected through respective isolation devices to one of said x lines, respectively, of said $x^{1,2 \cdots n-1}$ bus having said digit value of said number representation corresponding to said like numeral of significance $x^{1,2 \cdots n-1}$ for each of said nesting groups;

said plurality of number elements assembled, further assembled in groups of $x^n/a$ number elements, where a is any digit $\neq 0$, $x$ of said number representation;

ax lines, said high-order digit buses of each $(x^n/a)/x$ of said $x^n/a$ groups connected to one of said ax lines; and means for selectively connecting said ax lines to said x lines of said $x^n$ bus, whereby all the number elements of any one of said $x^n/a$ groups may be assigned any numeral of significance $x^n$ in said preselected directory numeral.

11. The automatic number identification apparatus as claimed in claim 10, further comprising:

means for storing a signal representative of an office code numeral; and means for selectively connecting any one of said ax lines to said storage means, whereby a signal appearing on any one of said input terminals of said number elements of said $x^n/a$ group associated with said one ax line is stored in said storage means as said signal representative of said office code numeral.

* * * * *